(12) United States Patent
Yadai et al.

(10) Patent No.: US 11,933,661 B2
(45) Date of Patent: Mar. 19, 2024

(54) SYSTEMS AND METHODS FOR WEIGHING PRODUCTS ON A SHELF

(71) Applicant: SHEKEL SCALES (2008) LTD., Beit Keshet (IL)

(72) Inventors: Evyatar Yadai, Be'er Sheva (IL); Guy Moshe, Be'er Ganim (IL)

(73) Assignee: SHEKEL SCALES (2008) LTD., Beit Keshet (IL)

( * ) Notice: Subject to any disclaimer, the term of this patent is extended or adjusted under 35 U.S.C. 154(b) by 623 days.

(21) Appl. No.: 17/134,713

(22) Filed: Dec. 28, 2020

(65) Prior Publication Data

US 2021/0148751 A1 May 20, 2021

Related U.S. Application Data

(63) Continuation-in-part of application No. PCT/IB2019/055488, filed on Jun. 28, 2019.

(30) Foreign Application Priority Data

Jun. 28, 2018 (GB) .................................... 1810672
Sep. 6, 2018 (GB) .................................... 1814504
(Continued)

(51) Int. Cl.
*G01G 19/52* (2006.01)
*G01G 3/14* (2006.01)
(Continued)

(52) U.S. Cl.
CPC ............... *G01G 19/52* (2013.01); *G01G 3/14* (2013.01); *G01G 21/23* (2013.01); *G06Q 10/087* (2013.01);
(Continued)

(58) Field of Classification Search
CPC .......... G01G 19/52; G01G 3/14; G01G 21/23; G01G 19/4144; G01G 21/28; G06Q 10/087; G07F 9/026; G07F 13/04; G07G 3/00
See application file for complete search history.

(56) References Cited

U.S. PATENT DOCUMENTS 3,927,132 A 12/1975 Willis et al.
3,927,139 A 12/1975 Bozer et al.
(Continued)

FOREIGN PATENT DOCUMENTS

CA 2071223 A1 6/1991
CN 2276152 Y 3/1998
(Continued)

OTHER PUBLICATIONS

Written Opinion for PCT/IB2020/062590 dated Apr. 22, 2021.
(Continued)

*Primary Examiner* — Mohammad K Islam
(74) *Attorney, Agent, or Firm* — Momentum IP; Marc Van Dyke

(57) ABSTRACT

A method for tracking non-homogeneous products on a shelf comprises monitoring weight measurement data points corresponding to the weight of the shelf and the products arranged thereupon, determining a set of weight-event parameters of a weight event, such as product identification and an action taken with respect to the product, and at least one of recording information about the results and displaying information about the results. A system for tracking non-homogeneous products on a shelf comprises processors for carrying out stored program instructions for carrying out the steps of the method.

7 Claims, 12 Drawing Sheets

(30) Foreign Application Priority Data

Dec. 24, 2018 (WO) .................. PCT/IB2018/060588
May 16, 2019 (WO) .................. PCT/IB2019/054082
Jun. 6, 2019 (WO) .................. PCT/IB2019/054746

(51) Int. Cl.
G01G 19/414 (2006.01)
G01G 21/23 (2006.01)
G01G 21/28 (2006.01)
G06Q 10/087 (2023.01)

(52) U.S. Cl.
CPC ......... G01G 19/4144 (2013.01); G01G 21/28 (2013.01)

(56) References Cited

U.S. PATENT DOCUMENTS

| | | | |
|---|---|---|---|
| 4,542,800 | A | 9/1985 | Knothe et al. |
| 4,548,086 | A | 10/1985 | Kastel |
| 4,600,066 | A | 7/1986 | Griffen et al. |
| 5,199,814 | A | 4/1993 | Clark et al. |
| 5,510,581 | A | 4/1996 | Angel |
| 5,651,616 | A | 7/1997 | Hustak et al. |
| 5,671,362 | A | 9/1997 | Cowe et al. |
| 5,929,391 | A | 7/1999 | Petrucelli et al. |
| 6,555,767 | B1 | 4/2003 | Lockery et al. |
| 7,679,009 | B2 | 3/2010 | Weichao |
| 8,648,267 | B2 | 2/2014 | Honda et al. |
| 9,046,408 | B2 | 6/2015 | Chan |
| 9,695,101 | B2 | 7/2017 | Shaver et al. |
| 9,738,125 | B1* | 8/2017 | Brickley ................. B60D 1/62 |
| 9,766,113 | B2 | 9/2017 | Trakhimovich |
| 10,007,892 | B1 | 6/2018 | Hahn et al. |
| 10,126,186 | B2 | 11/2018 | Berme et al. |
| 10,198,710 | B1 | 2/2019 | Hahn et al. |
| 10,274,359 | B2 | 4/2019 | Trakhimovich |
| 10,521,646 | B2* | 12/2019 | Adato ................... G06V 20/64 |
| 10,527,508 | B2 | 1/2020 | Berme et al. |
| 10,641,643 | B2 | 5/2020 | Trakhimovich |
| 10,704,951 | B2 | 7/2020 | Trakhimovich |
| 10,765,936 | B2 | 9/2020 | Berme et al. |
| 10,816,419 | B2 | 10/2020 | Lisiak |
| 11,092,477 | B2 | 8/2021 | Trakhimovich |
| 2003/0047603 | A1 | 3/2003 | Lustenberger et al. |
| 2004/0238236 | A1 | 12/2004 | Linglin et al. |
| 2005/0061553 | A1 | 3/2005 | Wang et al. |
| 2005/0145032 | A1 | 7/2005 | Takeuchi et al. |
| 2006/0051553 | A1 | 3/2006 | Kaplo et al. |
| 2007/0069867 | A1 | 3/2007 | Fleisch et al. |
| 2008/0022784 | A1 | 1/2008 | Wehinger et al. |
| 2008/0140087 | A1 | 6/2008 | Barbagli |
| 2012/0197828 | A1* | 8/2012 | Yi ............................ G06F 1/32 700/291 |
| 2013/0220709 | A1 | 8/2013 | Trakhimovich |
| 2014/0201042 | A1* | 7/2014 | Meyer ................. G06Q 10/087 705/28 |
| 2014/0291042 | A1 | 10/2014 | Tsutaya et al. |
| 2015/0096387 | A1 | 4/2015 | Berme et al. |
| 2015/0107913 | A1 | 4/2015 | Trakhimovich |
| 2015/0314507 | A1 | 11/2015 | Jang |
| 2016/0048798 | A1* | 2/2016 | Meyer ................... G01G 19/42 705/28 |
| 2016/0187186 | A1* | 6/2016 | Coleman ............. G01G 19/083 177/1 |
| 2016/0363475 | A1 | 12/2016 | Bedetti et al. |
| 2017/0199073 | A1 | 7/2017 | Carreel et al. |
| 2017/0211965 | A1 | 7/2017 | Trakhimovich |
| 2017/0249587 | A1 | 8/2017 | Jones et al. |
| 2018/0031412 | A1 | 2/2018 | Trakhimovich |
| 2018/0060805 | A1* | 3/2018 | Edwards ............. G06Q 10/087 |
| 2019/0015702 | A1 | 1/2019 | Krebs et al. |
| 2019/0104864 | A1* | 4/2019 | Barnet ................. A47B 96/021 |
| 2019/0301921 | A1 | 10/2019 | Trakhimovich |
| 2019/0324441 | A1 | 10/2019 | Cella et al. |
| 2020/0020112 | A1* | 1/2020 | Buibas ............... G01G 19/4144 |
| 2020/0132538 | A1* | 4/2020 | Marivoet .............. G01L 1/2287 |
| 2020/0202163 | A1* | 6/2020 | Feng ...................... G01G 19/52 |
| 2020/0326225 | A1 | 10/2020 | Trakhimovich |
| 2021/0043022 | A1* | 2/2021 | Ji ............................ G07F 9/002 |
| 2021/0131857 | A1 | 5/2021 | Trakhimovich |
| 2021/0148750 | A1 | 5/2021 | Trakhimovich |
| 2021/0148751 | A1 | 5/2021 | Yadai et al. |
| 2022/0011150 | A1 | 1/2022 | Trakhimovich |
| 2022/0230216 | A1* | 7/2022 | Buibas ................. G06V 10/454 |

FOREIGN PATENT DOCUMENTS

| | | |
|---|---|---|
| CN | 2436383 Y | 6/2001 |
| CN | 2676166 Y | 2/2005 |
| CN | 1869610 A | 11/2006 |
| CN | 2874442 Y | 2/2007 |
| CN | 203572558 U | 4/2014 |
| CN | 104395715 A | 3/2015 |
| CN | 105102056 A | 11/2015 |
| CN | 205483198 U | 8/2016 |
| CN | 206339001 U | 7/2017 |
| CZ | 31014 U1 | 9/2017 |
| DE | 102006024385 A1 | 12/2006 |
| EP | 0505493 A1 | 9/1992 |
| EP | 0742426 A1 | 11/1996 |
| EP | 0771410 A1 | 5/1997 |
| EP | 0789232 A2 | 8/1997 |
| EP | 1345016 A1 | 9/2003 |
| EP | 2784451 A1 | 10/2014 |
| EP | 2784452 A1 | 10/2014 |
| EP | 3070607 A1 | 9/2016 |
| EP | 3729018 A1 | 10/2020 |
| EP | 3815013 A1 | 5/2021 |
| EP | 3818345 A1 | 5/2021 |
| GB | 2528897 A | 2/2016 |
| JP | H08110260 A | 4/1996 |
| WO | 2013059716 A2 | 4/2013 |
| WO | 2013164675 A1 | 11/2013 |
| WO | 2016181352 A1 | 11/2016 |
| WO | 2019024951 A1 | 2/2019 |

OTHER PUBLICATIONS

International Search Report for PCT/IB2020/062590 dated Apr. 22, 2021.
Co-pending U.S. Appl. No. 17/789,195, inventor Ehud Hahamy, filed on Jun. 26, 2022.
International Search Report for PCT/IB2019055488 dated Jan. 2, 2020.
Written Opinion for PCT/IB2019055488 dated Jan. 2, 2020.
International Search Report for PCT/IB2019054746 dated Dec. 12, 2019.
Written Opinion for PCT/IB2019054746 dated Dec. 12, 2019.
International Search Report for PCT/IB2020055761 dated Dec. 30, 2020.
Written Opinion for PCT/IB2020055761 dated Dec. 30, 2020.
International Search Report for PCT/IB2018/060588 dated Jun. 27, 2019.
Written Opinion for PCT/IB2018/060588 dated Jun. 27, 2019.
International Search Report for PCT/IB2019054082 dated Nov. 21, 2019.
Written Opinion for PCT/IB2019054082 dated Nov. 21, 2019.
JPH08110260 Machine Translation (by google translate)—published Apr. 30, 1996.
CZ31014 Machine Translation (by google translate)—published Sep. 12, 2017.
DE102006024385 Machine Translation (by google translate)—published Dec. 21, 2006.
CN104395715 Machine Translation (by google translate)—published Jun. 12, 1991.
CN 105102056 Machine Translation (by google translate)—published Nov. 25, 2015.
CN 1869610 Machine Translation (by google translate)—published Nov. 29, 2006.

(56) References Cited

OTHER PUBLICATIONS

CN203572558 Machine Translation (by google translate)—published Apr. 30, 2014.
CN205483198 Machine Translation (by google translate)—published Aug. 17, 2016.
CN 206339001 Machine Translation (by google translate)—published Jul. 18, 2017.
CN 2276152 Machine Translation (by google translate)—published Mar. 11, 1998.
CN 2436383 Machine Translation (by google translate)—published Jun. 27, 2001.
CN 2676166 Machine Translation (by google translate)—published Feb. 2, 2005.
CN 2874442 Machine Translation (by google translate)—published Feb. 28, 2007.
Magnesium AM60B Cast Alloy M10602 by AZoMJul. 29, 2013: https://www.azom.com/article.aspx?ArticleID=9237 (Year: 2013).
Overview of materials for 2000 Series Aluminium Alloy, MATWEB http://www.matweb.com/search/DataSheet.aspx?MatGUID=2076184469d740af9f86b-0d69b2e42ff (Year: 2020).

\* cited by examiner

TOP PERSPECTIVE

BOTTOM PERSPECTIVE

FIRST MAPPING RULE, LINEAR DISTRIBUTION FUNCTION

FIRST MAPPING RULE, BIVARIATE PROBABILITY DISTRIBUTION

SYSTEMS AND METHODS FOR WEIGHING PRODUCTS ON A SHELF

CROSS-REFERENCE TO RELATED APPLICATIONS

This application is a continuation-in-part of International Patent Application No. PCT/IB2019/055488 filed on Jun. 28, 2019, and published as WO/2020003221 on Jan. 2, 2020, which is incorporated by reference for all purposes as if fully set forth herein. This invention claims priority from the following patent applications: Great Britain Patent Application No. 1810672.4, filed on Jun. 28, 2018; Great Britain Patent Application No. 1814504.5, filed on Sep. 6, 2018; International Application No. PCT/IB2018/060588, filed on Dec. 24, 2018; International Application No. PCT/IB2019/054082, filed on May 16, 2019, and International Application No. PCT/IB2019/054746, filed on Jun. 6, 2019, all of which applications are incorporated by reference for all purposes as if fully set forth herein.

FIELD OF THE INVENTION

The present invention relates to weighing devices and assemblies, including weighing devices and assemblies for shelves on which non-homogeneous assortments of products can be arranged, and methods for their use in tracking the weights, locations and identifications of products added to and removed from shelves.

BACKGROUND

Unattended or autonomous retail and inventory management are examples of areas that can benefit from the use of methods for weighing and tracking products on shelves. Technical solutions have been suggested for intelligent shelving arrangements that would track the weight of products on a shelf, including changes in the weight resulting from the addition of products or the removal of products. An example of such a suggested solution is a shelf segment assembly with load cells attached to the underside so that when the shelf segment is placed atop an existing 'regular' shelf, weights of the products on the shelf can be tracked. Such solutions are lacking in terms of being able to disambiguate unique products in diverse collections of products, instead dedicating each small shelf or shelf insert to a single product or stock-keeping unit (SKU).

Examples of shelving arrangements include connected shelving bays and standalone shelving arrangements. Connected shelving bays use a familiar type of shelving unit common in supermarkets and other retail stores. Standalone shelving arrangements are usually not connected to other shelving units and are often used in smaller retail environments such as, for example, kiosks, convenience stores, public areas of shopping malls, or shops in public venues such as train stations or airports. Either type of shelving arrangement can be suitable for practicing the embodiments disclosed herein.

SUMMARY

Embodiments of the present invention relate to methods and systems for tracking the weights of non-homogeneous products on shelves, and identifying, from changes in weights and in weight distributions, which products are being added to or removed from shelves, or moved from place to place on a single shelf. Some of the embodiments relate to methods and systems for applying probability distributions and other mathematical functions, and machine learning algorithms, in the disambiguation of product identifications and actions taken with respect to those products.

A method is disclosed herein for tracking non-homogeneous products on a shelf by using a plurality of weighing assemblies that are jointly operable to measure the combined weight of the shelf and of the products arranged thereupon, wherein the method comprises: (a) monitoring weight measurement data corresponding to the weight of the shelf and the products arranged thereupon, said weight measurement data measured by the plurality of weighing assemblies and transmitted therefrom as respective streams of weight measurement data points; (b) responsively to a change over time in the values of said weight measurement data, determining a set of weight-event parameters of a weight event, the set of weight-event parameters comprising a product identification and an action taken with respect to the product, the determining comprising: (i) aggregating, across all of the streams, changes in said weight measurement data corresponding to a specific time, (ii) mapping a change in weight distribution on the shelf, using the aggregated changes in weight measurement data, and (iii) assigning a set of weight-event parameters for resolving the mapped change in weight distribution, using product-weight data retrieved from a product database; and (c) performing at least one of: (i) recording information about the results of the selecting in a non-transient, computer-readable medium, and (ii) displaying information about the results of the selecting on a display device.

In some embodiments, each of the weighing assemblies comprises: (a) at least one load cell arrangement disposed on a single metal load cell body, said load cell body having a primary axis, a central longitudinal axis, and a transverse axis disposed transversely with respect to said primary and central longitudinal axes, a broad dimension of said load cell body being disposed perpendicular to said primary axis, each said load cell arrangement including: (i) a first contiguous cutout window passing through said broad dimension and formed by a first pair of cutout lines disposed generally parallel to said central longitudinal axis, and connected by a first cutout base; (ii) a second contiguous cutout window passing through said broad dimension and formed by a second pair of cutout lines disposed generally parallel to said central longitudinal axis, and connected by a second cutout base, wherein said second contiguous cutout window is transversely bounded by said first contiguous cutout window; (iii) a pair of measuring beams disposed along opposite edges of said load cell body and generally parallel to said central longitudinal axis, each of said measuring beams longitudinally defined by a respective cutout line of said first pair of cutout lines; (iv) a first flexure arrangement having a first pair of flexure beams, disposed along opposite sides of said central longitudinal axis, and generally parallel thereto, said first pair of flexure beams longitudinally disposed between said first pair of cutout lines and said second pair of cutout lines, and mechanically connected by a first flexure base; (v) a loading element, longitudinally defined by an innermost pair of cutout lines, comprising a receiving element and extending from an innermost flexure base, said transverse axis passing through said loading element; and (vi) at least one strain gage, fixedly attached to a surface of a measuring beam of said measuring beams.

In some embodiments, said assigning comprises: (i) identifying at least one candidate set of weight-event parameters for resolving the mapped change in weight distribution, using product-weight data retrieved from a product database, (ii) assigning an event likeliness score to each candidate set of weight-event parameters, and (iii) selecting the set of candidate weight-event parameters having the highest event likeliness score.

In some embodiments, the determining can use product positioning data from a product positioning plan in at least the identifying.

In some embodiments, the determining can include calculating a probability in at least the assigning. In some such embodiments, the probability can be calculated using a probability distribution function. In some such embodiments, a parameter of the probability distribution function can be derived using a machine learning algorithm applied to historical weight data for a product.

In some embodiments, the assigned set of weight-event parameters includes exactly one product and one action.

In some embodiments, the assigned set of weight-event parameters can include at least one of (i) two or more products and (ii) two or more actions.

In some embodiments, said action taken with respect to the product is selected from the group consisting of removing the product from the shelf, adding the product to the shelf, and moving the product from one position on the shelf to another.

In some embodiments, the determining is carried out responsively to an absolute value of the change over time in the values of said weight measurement data exceeding a pre-determined threshold.

In some embodiments, each stream of weight measurement data can include at least 50 data points per second.

In some embodiments, the method, additionally comprises, before said determining: responsively to a change over time in the values of transmitted weight measurement data, analyzing each of the streams of weight measurement data points to detect at least one of noise and drift; and in response to the detection of said at least one of noise and drift, performing at least one of (A) at least partially filtering out the noise and/or drift and (B) at least partially compensating for the noise and/or drift in the weight measurement data points, such that the performing generates revised weight measurement data, wherein (i) said aggregating includes aggregating said revised weight measurement data across all of the streams, and (ii) said mapping is based on the change in values in said revised weight measurement data.

In some embodiments, the noise includes changes in weight measurement data that subsequently are substantially reversed within less than 10 seconds.

In some embodiments, the noise includes changes in weight measurement data that subsequently are substantially reversed within less than 5 seconds.

In some embodiments, the noise includes changes in weight measurement data that subsequently are substantially reversed within less than 1 second.

In some embodiments, at least a portion of the drift is periodic.

A method is disclosed for mapping a change in weight distribution of a non-homogeneous plurality of products on a shelf, the method comprising: (a) receiving, from each of a plurality of weighing assemblies in contact with the shelf and jointly operable to measure the combined weight of the shelf and of products arranged thereupon, respective synchronized data streams of weight measurement data points, each of the weight measurement data points representing a proper fraction of the total weight of the shelf and of any products arranged thereupon, wherein the sum of the proper fractions represented by the received weight measurement data points for any given time is equal to one, the receiving including receiving, in response to an action taken with respect to a product, a weight measurement data point with a changed value, wherein said action taken with the respect to the product is one of: (i) removing the product from the shelf, (ii) adding the product to the shelf, and (iii) moving the product from one position on the shelf to another; (b) accessing an earlier mapping of the weight distribution of products on the shelf; and (c) in response to receiving said weight measurement data point with said changed value, remapping the weight distribution of products on the shelf, wherein the remapping includes (i) mapping a current weight distribution of the products on the shelf from said received synchronized data streams of weight measurement data points in accordance with a first mapping rule that applies a mathematical function for weight distribution, and (ii) comparing said current mapped weight distribution with said earlier mapping.

In some embodiments, the first mapping rule is that distribution of weight to weighing assemblies includes application of a linear function, such that on a shelf defining an x-y plane and having an origin at (0,0) and a diagonally opposite corner at (1,1), addition of a product on the shelf with weight of W and weight-center coordinates of (X,Y) causes weighing assemblies at (0,0), (0,1), (1,1), (1,0) to transmit respective weight measurement data points incremented by $(1-X)*(1-Y)*W$, $(1-X)*Y*W$, $X*Y*W$, $X*(1-Y)*W$.

In some embodiments, the first mapping rule is that the weight distribution of a product on a shelf is mapped from the weight measurement data points using a probability density function, such that on a shelf defining an x-y plane each product is represented in the remapped weight distribution at multiple (x,y) points. In some such embodiments, the probability density function is a bivariate normal distribution such that the multiple (x,y) points are distributed according to a first normal distribution on the x-axis and according to a second normal distribution on the y-axis.

In some embodiments, the remapping is additionally carried out in accordance with a second mapping rule, wherein the second mapping rule is that the remapping uses weight measurement data points corresponding to a time interval that is constrained. In some such embodiments, the time interval is constrained to end when differences between successive periodically accessed values of weight measurement data points in a data stream fall below a predetermined threshold. In some such embodiments, the length of the time interval is pre-determined. In some such embodiments, the pre-determined length of the time interval can be calculated based on a mechanical parameter of at least one of the shelf and a weighing assembly.

In some embodiments, the remapping can additionally be carried out on the basis of information accessed from a product positioning plan.

A system for tracking non-homogeneous products on a shelf is disclosed herein, the system comprising: (a) a plurality of weighing assemblies in contact with the shelf and jointly operable to measure the combined weight of the shelf and of products arranged thereupon; (b) one or more computer processors; and (c) a non-transient computer-readable storage medium comprising program instructions, which when executed by the one or more computer processors, cause the one or more computer processors to carry out the following steps: (i) monitoring weight measurement data corresponding to the weight of the shelf and the products arranged thereupon, said weight measurement data measured by the plurality of weighing assemblies and transmitted therefrom as respective streams of weight measurement data points; (ii) responsively to a change over time in the values of said weight measurement data, determining a set of weight-event parameters of a weight event, the set of weight-event parameters comprising a product identification and an action taken with respect to the product, the determining comprising: (A) aggregating, across all of the streams, changes in weight measurement data corresponding to a specific time, (B) mapping a change in weight distribution on the shelf, using the aggregated changes in weight measurement data, (C) assigning a set of weight-event parameters for resolving the mapped change in weight distribution, using product-weight data retrieved from a product database; and iii. performing at least one of: (A) recording information about the results of the selecting in a non-transient, computer-readable medium, and (B) displaying information about the results of the selecting on a display device.

In some embodiments, each of the weighing assemblies comprises: (a) at least one load cell arrangement disposed on a single metal load cell body, said load cell body having a primary axis, a central longitudinal axis, and a transverse axis disposed transversely with respect to said primary and central longitudinal axes, a broad dimension of said load cell body being disposed perpendicular to said primary axis, each said load cell arrangement including: (A) a first contiguous cutout window passing through said broad dimension and formed by a first pair of cutout lines disposed generally parallel to said central longitudinal axis, and connected by a first cutout base; (B) a second contiguous cutout window passing through said broad dimension and formed by a second pair of cutout lines disposed generally parallel to said central longitudinal axis, and connected by a second cutout base, wherein said second contiguous cutout window is transversely bounded by said first contiguous cutout window; (C) a pair of measuring beams disposed along opposite edges of said load cell body and generally parallel to said central longitudinal axis, each of said measuring beams longitudinally defined by a respective cutout line of said first pair of cutout lines; (D) a first flexure arrangement having a first pair of flexure beams, disposed along opposite sides of said central longitudinal axis, and generally parallel thereto, said first pair of flexure beams longitudinally disposed between said first pair of cutout lines and said second pair of cutout lines, and mechanically connected by a first flexure base; (E) a loading element, longitudinally defined by an innermost pair of cutout lines, comprising a receiving element and extending from an innermost flexure base, said transverse axis passing through said loading element; and (F) at least one strain gage, fixedly attached to a surface of a measuring beam of said measuring beams.

In some embodiments, said assigning comprises: (i) identifying at least one candidate set of weight-event parameters for resolving the mapped change in weight distribution, using product-weight data retrieved from a product database, (ii) assigning an event likeliness score to each candidate set of weight-event parameters, and (iii) selecting the set of candidate weight-event parameters having the highest event likeliness score.

A system for mapping the weight distribution of a non-homogeneous plurality of products on a shelf is disclosed, the system comprising: (a) one or more weighing assemblies, each weighing assembly comprising: (i) at least one load cell arrangement disposed on a single metal load cell body, said load cell body having a primary axis, a central longitudinal axis, and a transverse axis disposed transversely with respect to said primary and central longitudinal axes, a broad dimension of said load cell body being disposed perpendicular to said primary axis, each said load cell arrangement including: (A) a first contiguous cutout window passing through said broad dimension and formed by a first pair of cutout lines disposed generally parallel to said central longitudinal axis, and connected by a first cutout base; (B) a second contiguous cutout window passing through said broad dimension and formed by a second pair of cutout lines disposed generally parallel to said central longitudinal axis, and connected by a second cutout base, wherein said second contiguous cutout window is transversely bounded by said first contiguous cutout window; (C) a pair of measuring beams disposed along opposite edges of said load cell body and generally parallel to said central longitudinal axis, each of said measuring beams longitudinally defined by a respective cutout line of said first pair of cutout lines; (D) a first flexure arrangement having a first pair of flexure beams, disposed along opposite sides of said central longitudinal axis, and generally parallel thereto, said first pair of flexure beams longitudinally disposed between said first pair of cutout lines and said second pair of cutout lines, and mechanically connected by a first flexure base; (E) a loading element, longitudinally defined by an innermost pair of cutout lines, comprising a receiving element and extending from an innermost flexure base, said transverse axis passing through said loading element; and (F) at least one strain gage, fixedly attached to a surface of a measuring beam of said measuring beams; (b) one or more computer processors; and (c) a non-transient computer-readable storage medium comprising program instructions, which when executed by the one or more computer processors, cause the one or more computer processors to carry out the following steps: (i) receiving, from each of the plurality of weighing assemblies, respective synchronized data streams of weight measurement data points, each of the weight measurement data points representing a proper fraction of the total weight of the shelf and of any products arranged thereupon, wherein the sum of the proper fractions represented by the weight measurement data points for any given time is equal to one; (ii) accessing, from transient or non-transient computer memory, an earlier mapping of the weight distribution of products on the shelf; and (iii) in response to receiving a weight measurement data point with a changed value, remapping the weight distribution of products on the shelf, the remapping being carried out (A) using a comparison of received weight measurement data points with the earlier mapping, (B) in accordance with a mapping rule that applies a mathematical function for weight distribution.

Embodiments of a method for tracking non-homogeneous products on a shelf are disclosed. A plurality of weighing assemblies is jointly operable to measure the combined weight of the shelf and of products arranged thereupon. The method comprises: (a) monitoring electronic signals transmitted by the plurality of weighing assemblies, each weighing assembly transmitting an electronic signal that includes a respective stream of weight measurement data points corresponding to the weight of the shelf and the products arranged thereupon; (b) responsively to a change over time in the values of transmitted weight measurement data, determining a set of weight-event parameters of a weight event, the set of weight-event parameters comprising a product identification and an action taken with respect to the product, the determining comprising: (i) aggregating, across all of the streams, changes in weight measurement data corresponding to a specific time, (ii) mapping a change in weight distribution on the shelf, using the aggregated changes in weight measurement data, (iii) identifying at least one candidate set of weight-event parameters for resolving the mapped change in weight distribution, using product-weight data retrieved from a product database, (iv) assigning an event likeliness score to each candidate set of weight-event parameters, and (v) selecting the set of candidate weight-event parameters having the highest event likeliness score; and (c) performing at least one of: (i) recording information about the results of the selecting in a non-transient, computer-readable medium, and (ii) displaying information about the results of the selecting on a display device.

In some embodiments, the determining can use product positioning data from a product positioning plan in at least the identifying. In some embodiments, the determining includes calculating a probability in at least the identifying. The probability can be calculated using a probability distribution function. A parameter of the probability distribution function can be derived using a machine learning algorithm applied to historical weight data for a product.

In some embodiments, the selected set of weight-event parameters can include exactly one product and one action. In some embodiments, the selected set of weight-event parameters can include at least one of (i) two or more products and (ii) two or more actions.

In some embodiments, the action taken with respect to a product can be selected from the group consisting of removing the product from a shelf, adding the product to a shelf, and moving the product from one position on the shelf to another.

In embodiments, the determining can be carried out responsively to an absolute value of the change over time in the values of the transmitted weight measurement data exceeding a pre-determined threshold.

In some embodiments, each stream of weight measurement data points can include at least 50 data points per second, or at least 100 data points per second.

Embodiments of a method for tracking non-homogeneous products on a shelf are disclosed. A plurality of weighing assemblies is jointly operable to measure the combined weight of the shelf and of products arranged thereupon. The method comprises: (a) monitoring electronic signals transmitted by the plurality of weighing assemblies, each weighing assembly transmitting an electronic signal that includes a respective stream of weight measurement data points corresponding to the weight of the shelf and the products arranged thereupon; (b) responsively to a change over time in the values of transmitted weight measurement data, analyzing each of the streams of weight measurement data points to detect at least one of noise and drift; (c) in response to the detection of said at least one of noise and drift, performing at least one of (A) at least partially filtering out the noise and/or drift and (B) at least partially compensating for the noise and/or drift in the weight measurement data points, such that the performing generates revised weight measurement data; (d) responsively to a change over time in values of the revised weight measurement data, determining a set of weight-event parameters of a weight event, the set of weight-event parameters comprising a product identification and an action taken with respect to the product, the determining comprising: (i) remapping a revised weight distribution on the shelf based on (A) an earlier mapping of weight distribution on the shelf, (B) the change in values in the revised weight measurement data, and (C) product-weight data from a product database, and (ii) assigning a set of weight-event parameters based on the remapping; and (e) performing at least one of: (i) recording information about the results of the assigning in a non-transient, computer-readable medium, and (ii) displaying information about the results of the assigning on a display device.

In some embodiments, the noise can include changes in weight measurement data that subsequently are substantially reversed within less than 10 seconds. The noise can include changes in weight measurement data that subsequently are substantially reversed within less than 1 second. In some embodiments, at least a portion of the drift can be periodic.

In some embodiments, the determining can be carried out in response to an absolute value of the change over time in the values of the revised weight measurement data exceeding a pre-determined threshold. In some embodiments, each stream of weight measurement data points can include at least 50 data points per second, or at least 100 data points per second.

Embodiments of a method for mapping the weight distribution of a non-homogeneous plurality of products on a shelf are disclosed. The method comprises: (a) receiving, from each of a plurality of weighing assemblies, respective synchronized data streams of weight measurement data points, each of the weight measurement data points representing a proper fraction of the total weight of the shelf and of any products arranged thereupon, wherein the sum of the proper fractions represented by the received weight measurement data points for any given time is equal to one; (b) accessing, from transient or non-transient computer memory, an earlier mapping of the weight distribution of products on the shelf; and (c) in response to receiving a weight measurement data point with a changed value, remapping the weight distribution of products on the shelf, the remapping being carried out (i) using a comparison of received weight measurement data points with the earlier mapping, (ii) in accordance with a first mapping rule that applies a mathematical function for weight distribution.

In some embodiments, it can be that the first mapping rule is that distribution of weight to weighing assemblies includes application of a linear function, such that on a shelf defining an x-y plane and having an origin at (0,0) and a diagonally opposite corner at (1,1), addition of a product on the shelf with weight of W and weight-center coordinates of (X,Y) causes weighing assemblies at (0,0), (0,1), (1,1), (1,0) to transmit respective weight measurement data points incremented by (1−X)*(1−Y)*W, (1−X)*Y*W, X*Y*W, X*(1−Y)*W.

In some embodiments, it can be that the first mapping rule is that the weight distribution of a product on a shelf is mapped from the weight measurement data points using a probability density function, such that on a shelf defining an x-y plane each product is represented in the remapped weight distribution at multiple (x,y) points. The probability density function can be a bivariate normal distribution such that the multiple (x,y) points are distributed according to a first normal distribution on the x-axis and according to a second normal distribution on the y-axis.

In some embodiments, the remapping can be additionally carried out in accordance with a second mapping rule, wherein the second mapping rule is that the remapping uses weight measurement data points corresponding to a time interval that is constrained. The time interval can be constrained to end when differences between successive periodically accessed values of weight measurement data points in a data stream fall below a predetermined threshold. The length of the time interval can be pre-determined. The pre-determined length of the time interval can be calculated based on a mechanical parameter of at least one of the shelf and a weighing assembly.

In some embodiments, the remapping is additionally carried out on the basis of information accessed from a product positioning plan.

In embodiments, a system for tracking non-homogeneous products on a shelf comprises: (a) a plurality of weighing assemblies in contact with the shelf and jointly operable to measure the combined weight of the shelf and of products arranged thereupon; (b) one or more computer processors; and (c) a non-transient computer-readable storage medium comprising program instructions, which when executed by the one or more computer processors, cause the one or more computer processors to carry out the following steps: (i) monitoring electronic signals transmitted by the plurality of weighing assemblies, wherein each electronic signal includes a respective stream of weight measurement data points corresponding to the weight of the shelf and the products arranged thereupon; (ii) responsively to a change over time in the values of transmitted weight measurement data, determining a set of weight-event parameters of a weight event, the set of weight-event parameters comprising a product identification and an action taken with respect to the product, the determining comprising: (A) aggregating, across all of the streams, changes in weight measurement data corresponding to a specific time, (B) mapping a change in weight distribution on the shelf, using the aggregated changes in weight measurement data, (C) identifying at least one candidate set of weight-event parameters for resolving the mapped change in weight distribution, using product-weight data retrieved from a product database, (D) assigning an event likeliness score to each candidate set of weight-event parameters, and (E) selecting the set of candidate weight-event parameters having the highest event likeliness score; and (iii) performing at least one of: (A) recording information about the results of the selecting in a non-transient, computer-readable medium, and (B) displaying information about the results of the selecting on a display device.

In embodiments, a system for tracking non-homogeneous products on a shelf comprises: (a) a plurality of weighing assemblies in contact with the shelf and jointly operable to measure the combined weight of the shelf and of products arranged thereupon; (b) one or more computer processors; and (c) a non-transient computer-readable storage medium comprising program instructions, which when executed by the one or more computer processors, cause the one or more computer processors to carry out the following steps: (i) monitoring electronic signals transmitted by the plurality of weighing assemblies, wherein each electronic signal includes a respective stream of weight measurement data points corresponding to the weight of the shelf and the products arranged thereupon; (ii) analyzing, responsively to a change over time in the values of transmitted weight measurement data, each of the streams of weight measurement data points to detect at least one of noise and drift; (iii) performing, in response to the detection of said at least one of noise and drift, at least one of (A) at least partially filtering out the noise and/or drift and (B) at least partially compensating for the noise and/or drift in the weight measurement data points, such that the performing generates revised weight measurement data; (iv) determining, responsively to a change over time in values of the revised weight measurement data, a set of weight-event parameters of a weight event, the set of weight-event parameters comprising a product identification and an action taken with respect to the product, the determining comprising: (A) remapping a revised weight distribution on the shelf based on an earlier mapping of weight distribution on the shelf, the change in values in the revised weight measurement data, and product-weight data from a product database, and (B) assigning a set of weight-event parameters based on the remapping; and (v) performing at least one of: (i) recording information about the results of the assigning in a non-transient, computer-readable medium, and (ii) displaying information about the results of the assigning on a display device.

In embodiments, a system for mapping the weight distribution of a non-homogeneous plurality of products on a shelf comprises: (a) one or more computer processors; and (b) a non-transient computer-readable storage medium comprising program instructions, which when executed by the one or more computer processors, cause the one or more computer processors to carry out the following steps: (i) receiving, from each of a plurality of weighing assemblies, respective synchronized data streams of weight measurement data points, each of the weight measurement data points representing a proper fraction of the total weight of the shelf and of any products arranged thereupon, wherein the sum of the proper fractions represented by the weight measurement data points for the any given time is equal to one; (ii) accessing, from transient or non-transient computer memory, an earlier mapping of the weight distribution of products on the shelf; and (iii) in response to receiving a weight measurement data point with a changed value, remapping the weight distribution of products on the shelf, the remapping being carried out (A) using a comparison of received weight measurement data points with the earlier mapping, (B) in accordance with a first mapping rule that applies a mathematical function for weight distribution.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE ILLUSTRATED EMBODIMENTS

Figure 1A:
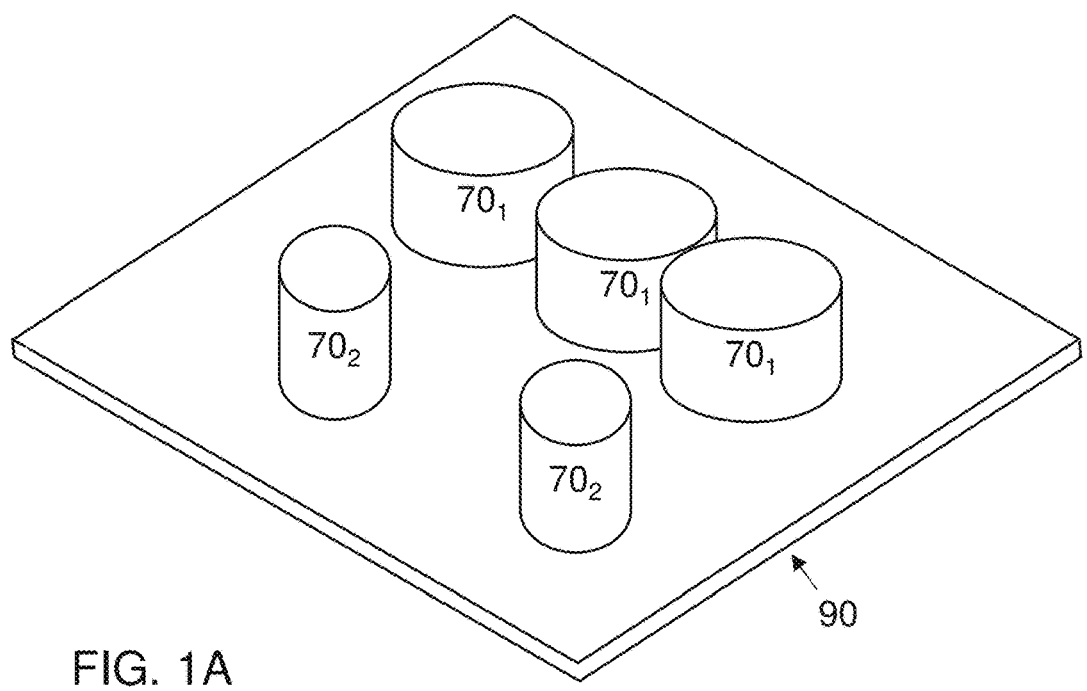
FIG. 1A is a schematic perspective view of a shelf with a diverse plurality of products arranged thereupon, according to embodiments.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements. Subscripted reference numbers (e.g., $10_1$) or letter-modified reference numbers (e.g., $100a$) are used to designate multiple separate appearances of elements in a single drawing, e.g. $10_1$ is a single appearance (out of a plurality of appearances) of element 10, and $100a$ is a single appearance (out of a plurality of appearances) of element 100.

A system for mapping the weight distribution of a non-homogeneous plurality of products on a shelf is disclosed, the system comprising: (a) one or more weighing assemblies, each weighing assembly comprising: (i) at least one load cell arrangement disposed on a single metal load cell body, said load cell body having a primary axis, a central longitudinal axis, and a transverse axis disposed transversely with respect to said primary and central longitudinal axes, a broad dimension of said load cell body being disposed perpendicular to said primary axis, each said load cell arrangement including: (A) a first contiguous cutout window passing through said broad dimension and formed by a first pair of cutout lines disposed generally parallel to said central longitudinal axis, and connected by a first cutout base; (B) a second contiguous cutout window passing through said broad dimension and formed by a second pair of cutout lines disposed generally parallel to said central longitudinal axis, and connected by a second cutout base, wherein said second contiguous cutout window is transversely bounded by said first contiguous cutout window; (C) a pair of measuring beams disposed along opposite edges of said load cell body and generally parallel to said central longitudinal axis, each of said measuring beams longitudinally defined by a respective cutout line of said first pair of cutout lines; (D) a first flexure arrangement having a first pair of flexure beams, disposed along opposite sides of said central longitudinal axis, and generally parallel thereto, said first pair of flexure beams longitudinally disposed between said first pair of cutout lines and said second pair of cutout lines, and mechanically connected by a first flexure base; (E) a loading element, longitudinally defined by an innermost pair of cutout lines, comprising a receiving element and extending from an innermost flexure base, said transverse axis passing through said loading element; and (F) at least one strain gage, fixedly attached to a surface of a measuring beam of said measuring beams; (b) one or more computer processors; and (c) a non-transient computer-readable storage medium comprising program instructions, which when executed by the one or more computer processors, cause the one or more computer processors to carry out the following steps: (i) receiving, from each of the plurality of weighing assemblies, respective synchronized data streams of weight measurement data points, each of the weight measurement data points representing a proper fraction of the total weight of the shelf and of any products arranged thereupon, wherein the sum of the proper fractions represented by the weight measurement data points for any given time is equal to one; (ii) accessing, from transient or non-transient computer memory, an earlier mapping of the weight distribution of products on the shelf; and (iii) in response to receiving a weight measurement data point with a changed value, remapping the weight distribution of products on the shelf, the remapping being carried out (A) using a comparison of received weight measurement data points with the earlier mapping, (B) in accordance with a mapping rule that applies a mathematical function for weight distribution.

In accordance with embodiments of the invention, methods and systems for tracking products and product weights on weighing-enabled shelving arrangements with autonomous weighing capabilities are disclosed. Weighing-enabled shelving arrangements can be useful for enabling, for example, inventory management or unattended retail transactions, where the weight of a product removed from a shelf can be automatically recorded and subsequently used in charging a customer for the product. Similarly, tracking the addition of a product to a shelf or the moving of a product one place to another within a shelf can be useful. Typically, the shelving arrangement is connected to a computing device with a tracking module for tracking the weight of all products on a given shelf. The tracking module can respond to a change in weight on the shelf (or of the shelf plus the products stored thereupon) by, for example, sending information to a retail module that charges the customer for products taken. Additionally or alternatively, a tracking module can respond to a change in weight on the shelf by, for example, updating an inventory record. The computing device can also include a database of products and respective weights, so that the particular product removed from the shelf can be identified, for example, by stock-keeping unit (SKU) number. The database can include or be linked to a statistical analysis of weights for any given product, and the computing device can in some embodiments collect and use historical data to perform unsupervised (or, alternatively, supervised) machine learning in order to calculate the probability that a given measured change in weight relates to the addition, removal or moving of specific products. The computing device can also use information accessed in a planogram, which is a representation of the preferred or default product positioning plan layout for a shelving arrangement, as is known in the retail industry. The tracking module can also be linked to a retail module and/or an inventory module which can process the information from the tracking module and complete a retail sales transaction and/or record a change in inventory, respectively.

Figure 1B:
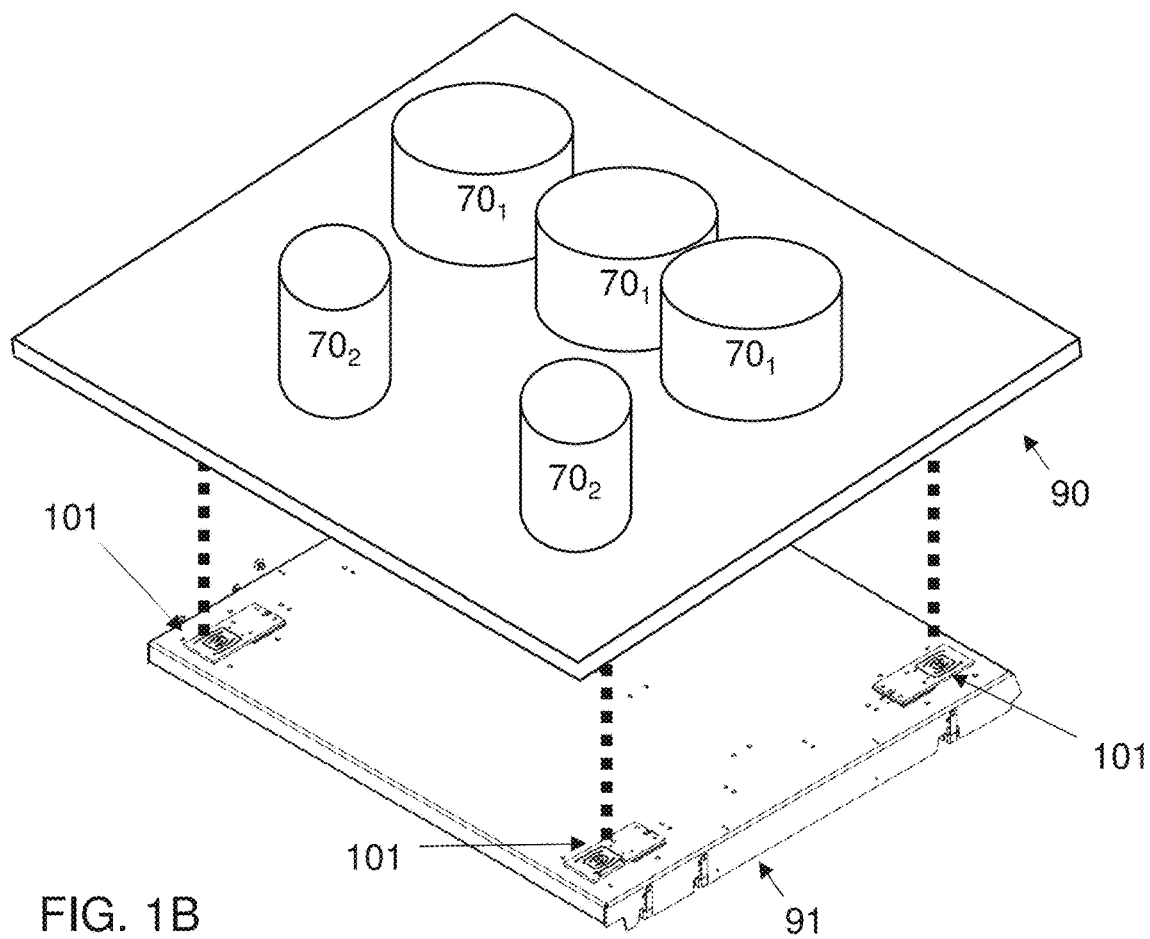
FIG. 1B is a schematic perspective view of a shelf and products of FIG. 1A, the shelf being in contact with a shelf base comprising a plurality of weighing assemblies.

We now refer to FIGS. 1A and 1B. In embodiments, a shelf 90 is provided for storing or displaying products 70. Products can be diverse, e.g., 70₁ and 70₂ are different products, and any number of each type of different products can be placed on a shelf 90. While shown as differing in size and shape, they can also differ in weight, dimensions, contents or weight history (e.g., a histogram of past weight values for each respective product), and can be distinguished by having different SKUs, i.e., stock-keeping unit identification numbers, or by other unique identifiers. As used herein, the term "SKU" means stock-keeping unit. The use of SKU-identifiers is a standard means of identifying unique products across industries. Unique products can be, for example, products defined by unique combinations of physical characteristics, e.g., weight (whether nominal or average), volume, dimensions, etc. and/or non-physical characteristics, e.g., brand or packaging design. It can be that two products can be similar in physical characteristics but have different SKU-identifiers; in some embodiments they can be considered as 'non-homogeneous' and in other embodiments they may not. However, any use of the term 'products' in this disclosure or in the claims attached thereto includes the concept of 'non-homogeneous products'. In an example, a particular brand of cookies may offer products with a number of different SKU-identifiers: a first SKU for the brand's large package of large chocolate cookies, a second SKU for the brand's small package of the same large chocolate cookies, and a third SKU for the brand's large package of small chocolate cookies, and so on. The term "non-homogeneous", as applied herein to a group of products, means that the products in the group do not all share the same SKU-identifier, but should not be understood to imply that each product in a group has a unique SKU-identifier. For example, a group of non-homogeneous products might include: (a) 10 large packages of large chocolate cookies bearing a first brand and having a first SKU-identifier, and (b) 2 large packages of small chocolate cookies from a second brand and having a second SKU-identifier, or, without limitation any combination of products having, in combination, two or more SKU-identifiers. A group of products having, in combination, two or more SKU-identifiers can be considered 'non-homogeneous' with respect to one another. Thus, within any group of non-homogeneous products, products can differ from other members of the group in terms of, and not exhaustively: product packaging design and/or materials, weight, size, one or more external dimensions, brand, contents, list of ingredients, size and number of sub-divisions within a product packaging, and product-weight history such as can be represented by a database of past weight data, where the past weight data can encompass not only total weight but also the distribution of weight over the footprint of the product.

Figure 2:
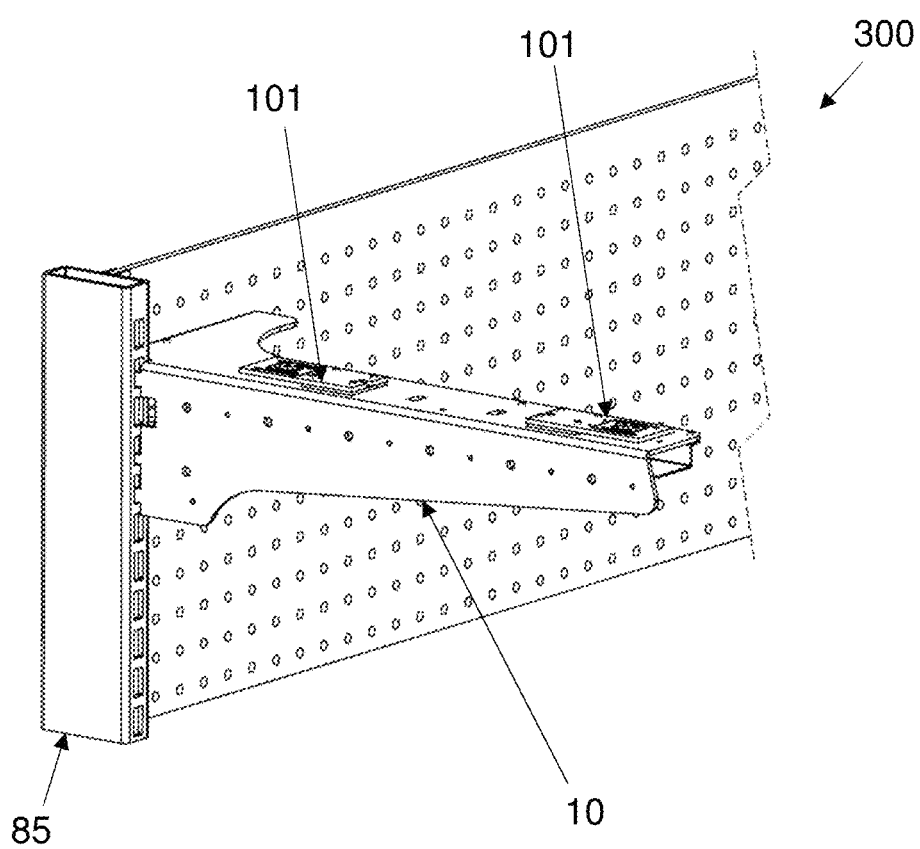
FIG. 2 is a schematic perspective view of a bracket assembly for a shelving bay, comprising a plurality of weighing assemblies, according to embodiments.

As shown in FIG. 1B, the shelf 90 can be in contact, at least indirectly, with weighing assemblies 101, so that the weighing assemblies 101 can measure the weight of the shelf 70 and of products 70 on the shelf 90. In the non-limiting example of FIG. 1B, the weighing assemblies 101 are provided as part of a shelf base 91 which supports the shelf 90 when installed. In another non-limiting example illustrated in FIG. 2, weighing assemblies 101 are provided in a bracket assembly 10 attached to an upright 85 of a shelving unit 300 of a connected retail-type shelving bay, and a shelf 90 can be supported by two such bracket assemblies 10 provided at opposite ends of the shelf 90. The weighing assemblies 101 are illustrated as planar load cell assemblies, but any suitable weight sensor can be used, although preferably one with fast response time and high levels of precision. Additional examples of weighing assemblies integrated into shelves and shelf assemblies will be discussed with reference to FIGS. 4A, 4B, 5A and 5B.

Weighing assemblies 101 can include internal processors (not shown), which can be configured, for example, to sample continuous or discrete weight measurements and transmit streams of weight measurement data points to an external processor, using internal communications arrangements (not shown). The sampling rate is preferably at least 50 Hz, or at least 100 Hz, or at least 200 Hz, or higher. A high sampling rate can be helpful, for example, if it is desired to filter out noise. An electronic signal transmitting a stream of weight measurement data points can be analyzed to detect noise, for example by decomposing the signal into component frequencies using a Fourier transform, as is known in the art. Noise in the signal can come from mechanical and/or environmental sources, for example from vibrations due to mechanical equipment in the area.

Discussion of Load Cell Assembly Embodiments

Load cells with low profiles may have a characteristically low amplitude signal. Given limitations in the total weight to be measured, and the inherent sensitivity of load cells, the performance of such devices may be compromised by a high noise-to-signal ratio and by unacceptable settling times. Various embodiments of the present invention resolve, or at least appreciably reduce, parasitic noise issues associated with typical low-profile load cells and enable high accuracy weight measurements.

Loading of a spring arrangement is effected by placing a load on, or below, a loading beam, depending on whether the loading beam is anchored to the weighing platform, or to the weighing base. (Note: the term "weighing base" is used herein interchangeable with the term "load cell base" and no difference in meaning between the two terms should be inferred.) The loading beam may also be referred to as the "loading element" or as the "load-receiving element" or "load-supporting element" (depending on the configuration) of the load cell assembly. The spring arrangement has at least one flexure arrangement having at least two flexures or flexural elements operatively connected in series. The flexure arrangement is operatively connected, at a first end, to the loading beam, and at a second end, to the free or adaptive end of at least one measuring beam.

The flexure arrangement has n flexures (n being an integer) operatively connected in series, the first of these flexures being operatively connected to the loading beam, and the ultimate flexure of the n flexures being operatively connected in series to a second flexure, which in turn, is operatively connected to the first flexure in an assembly of m flexures (m being an integer), operatively connected in series. The ultimate flexure of the m flexures is operatively connected, in series, to a measuring beam of the spring arrangement. Associated with the measuring beam is at least one strain gage, which produces weighing information with respect to the load.

The inventor has discovered that at least two of such flexure arrangements, disposed generally in parallel, may be necessary for the loading element to be suitably disposed substantially in a horizontal position (i.e., perpendicular to the load).

In some embodiments, and particularly when extremely high accuracy is not necessary, a single flexure disposed between the loading beam and the measuring beam may be sufficient. This single flexure load cell arrangement may also exhibit increased crosstalk with other load cell arrangements (weighing assemblies may typically have 4 of such load cell arrangements for a single weighing platform). For a given nominal capacity, the overload capacity may also be compromised with respect to load cell arrangements having a plurality of flexures disposed in series between the load receiving beam and the measuring beam. This reduced overload capacity may be manifested as poorer durability and/or shorter product lifetime, with respect to load cell arrangements having a plurality of flexures disposed in series. Nonetheless, the overall performance of the single-flexure may compare favorably with conventional weighing apparatus and load cell arrangements. In any event, for this case, m+n=−1, which is the lowest value of m+n flexures for the present invention.

Moreover, there may be two or more spring arrangements for each loading element, disposed in parallel. Typically, and as described hereinbelow with respect to FIGS. 4A and 4B, the spring arrangement may include pairs of coupled flexures and coupled measuring beams.

Typically, there are 4 strain gages per loading beam. The strain gages may be configured in a Wheatstone bridge configuration, a configuration that is well known to those of skill in the art. The load cell system may further include a processing unit, such as a central processing unit (CPU). The processing unit may be configured to receive the load or strain signals (e.g., from 4 strain gages SG1-SG4) from each particular load cell and to produce a weight indication based on the load signals, as is known to those of ordinary skill in the art.

Figures 3A, 3B:
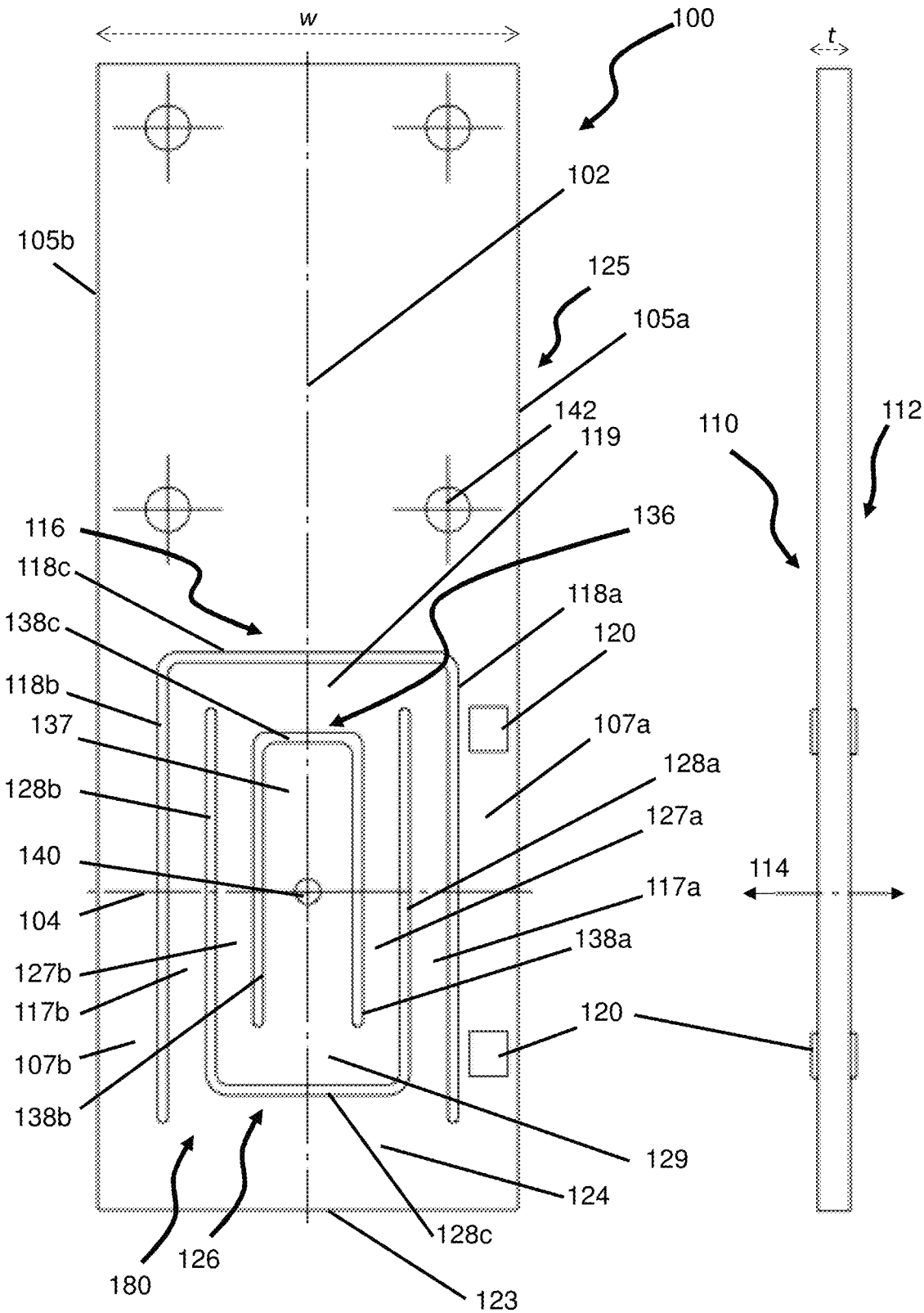
FIGS. 3A and 3B are respectively top and side schematic views of a planar load cell assembly, according to an embodiment of the present invention.

Referring collectively to FIGS. 3A and 3B, a load cell body 125 may be made from a block of load cell quality metal or alloy. Particularly advantageous embodiments employing particular magnesium alloys will be described hereinbelow.

Load cell body 125 may be fixed to a weighing assembly 10 via one or more mounting holes or elements 142. A $1^{st}$ contiguous cutout window 116 passes from a top face 110 through a bottom face 112, perpendicularly through the broad dimension (i.e., with respect to the other 2 dimensions of a three-dimensional Cartesian system) of load cell body 125. $1^{st}$ contiguous cutout window 116 may be generally C-shaped or U-shaped, and may have arms or a pair of cutout lines 118a, 118b running generally parallel to a central longitudinal axis 102 of load cell body 125, and connected or made contiguous by a cutout line or cutout base 118c. Both central longitudinal axis 102 and a transverse axis 104, disposed transversely thereto, run generally parallel to the broad dimension of load cell body 125. Both of these axes are oriented in perpendicular fashion with respect to a primary axis 114. The thickness (indicated by the arrow marked 't' in FIG. 2B) of load cell body 125 perpendicular to primary axis 114 is typically within a range of 2 mm to 10 mm, and is designated $W_{LCB}$.

Long sides 105a and 105b of load cell body 125 run generally along, or parallel to, central longitudinal axis 102.

As shown, measuring beams or spring elements 107a and 107b are each disposed between respective cutout lines 118a and 118b, and respective long sides 105a and 105b of load cell body 125, distal to cutout lines 118a and 118b with respect to transverse axis 104. When planar load cell assembly 100 is disposed in a vertically loaded position, the free end of each of beams 107a and 107b may be held in a fixed relationship, substantially perpendicular to the vertical load, by an end block 124 disposed at a free end 123 of load cell body 125.

A $2^{nd}$ contiguous cutout window 126 also passes from top face 110 through bottom face 112, perpendicularly through the broad dimension of load cell body 125. $2^{nd}$ contiguous cutout window 126 may be generally C-shaped or U-shaped, and may have arms or a pair of cutout lines 128a, 128b running generally parallel to central longitudinal axis 102, and connected or made contiguous by a cutout line or cutout base 128c. $2^{nd}$ contiguous cutout window 126 may be enveloped on three sides by $1^{st}$ contiguous cutout window 116 (such that the $2^{nd}$ contiguous cutout window is transversely bounded by the $1^{st}$ contiguous cutout window). The orientation of $2^{nd}$ contiguous cutout window 126 may be 180° (i.e., generally opposite) with respect to $1^{st}$ contiguous cutout window 116.

A $3^{rd}$ contiguous cutout window 136 also passes from top face 110 through bottom face 112, perpendicularly through the broad dimension of load cell body 125. $3^{rd}$ contiguous cutout window 136 may be generally C-shaped or U-shaped, and may have arms or a pair of cutout lines 138a, 138b running generally parallel to central longitudinal axis 102, and connected or made contiguous by a cutout line or cutout base 138c. $3^{rd}$ contiguous cutout window 136 may be enveloped on three sides by $2^{nd}$ contiguous cutout window 126 (such that the $3^{rd}$ contiguous cutout window is transversely bounded by the $2^{nd}$ contiguous cutout window). The orientation of $3^{rd}$ contiguous cutout window 136 may be 180° (i.e., generally opposite) with respect to $2^{nd}$ contiguous cutout window 126 (and generally aligned with $1^{st}$ contiguous cutout window 116).

Load cell body 125 has a first flexure arrangement having a first pair of flexure beams 117a, 117b disposed along opposite sides of central longitudinal axis 102, and distal and generally parallel thereto. First pair of flexure beams 117a, 117b may be longitudinally disposed between the first pair of cutout lines and the second pair of cutout lines, and mechanically connected or coupled by a first flexure base 119.

Load cell body 125 has a second flexure arrangement having a second pair of flexure beams 127a, 127b disposed along opposite sides of central longitudinal axis 102, and distal and parallel thereto. Second pair of flexure beams 127a, 127b may be longitudinally disposed between the first pair of cutout lines and the second pair of cutout lines, and mechanically connected or coupled by a second flexure base 129.

Contiguous cutout window 136 defines a loading element 137 disposed therein. Loading element 137 is longitudinally defined by $3^{rd}$ pair of cutout lines 138a and 138b, and is connected to, and extends from, second flexure base 129.

The various cutout lines described above may typically have a width ($W_{CO}$) of 0.2 mm to 5 mm, and more typically, 0.2 mm to 2.5 mm, 0.2 mm to 2.0 mm, 0.2 mm to 1.5 mm, 0.2 mm to 1.0 mm, 0.2 mm to 0.7 mm, 0.2 mm to 0.5 mm, 0.3 mm to 5 mm, 0.3 mm to 2.5 mm, 0.3 mm to 2.0 mm, 0.3 mm to 1.5 mm, 0.3 mm to 1.0 mm, 0.3 mm to 0.7 mm, 0.3 mm to 0.6 mm, or 0.3 mm to 0.5 mm.

In some embodiments, the ratio of $W_{CO}$ to $W_{LCB}$ ($W_{CO}/W_{LCB}$) is at most 0.5, at most 0.4, at most 0.3, at most 0.25, at most 0.2, at most 0.15, at most 0.12, at most 0.10, at most 0.08, at most 0.06, or at most 0.05.

In some embodiments, the ratio of $W_{CO}$ to $W_{LCB}$ ($W_{CO}/W_{LCB}$) is within a range of 0.03 to 0.5, 0.03 to 0.4, 0.03 to 0.3, 0.03 to 0.2, 0.03 to 0.15, 0.03 to 0.10, 0.04 to 0.5, 0.04 to 0.4, 0.04 to 0.3, 0.04 to 0.2, 0.04 to 0.15, 0.04 to 0.10, 0.05 to 0.5, 0.05 to 0.4, 0.05 to 0.3, 0.05 to 0.2, 0.05 to 0.15, or 0.05 to 0.10. Loading element 137 may also include a hole 140, which may be a threaded hole, for receiving a load, e.g., for receiving or connecting to an upper, weighing platform, or for supporting a load, e.g., connecting to a base, leg, or support (disposed below load cell body 125) of a weighing system (described with respect to FIG. 7). Load-receiving hole 140 may be positioned at an intersection of central longitudinal axis 102 and transverse axis 104.

Figure 4A:
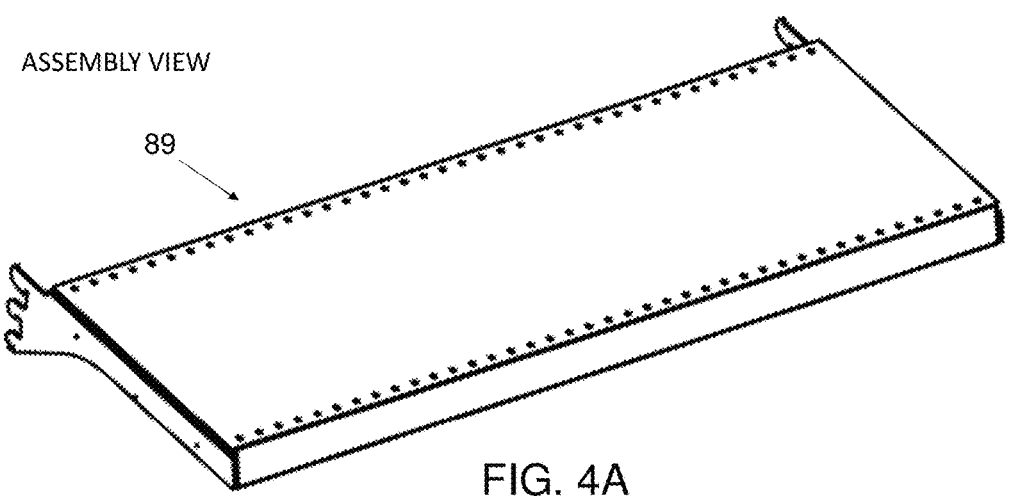
FIGS. 4A and 4B are respectively perspective and exploded perspective views of a weighing assembly including two shelf brackets according to embodiments.
Figure 4B:
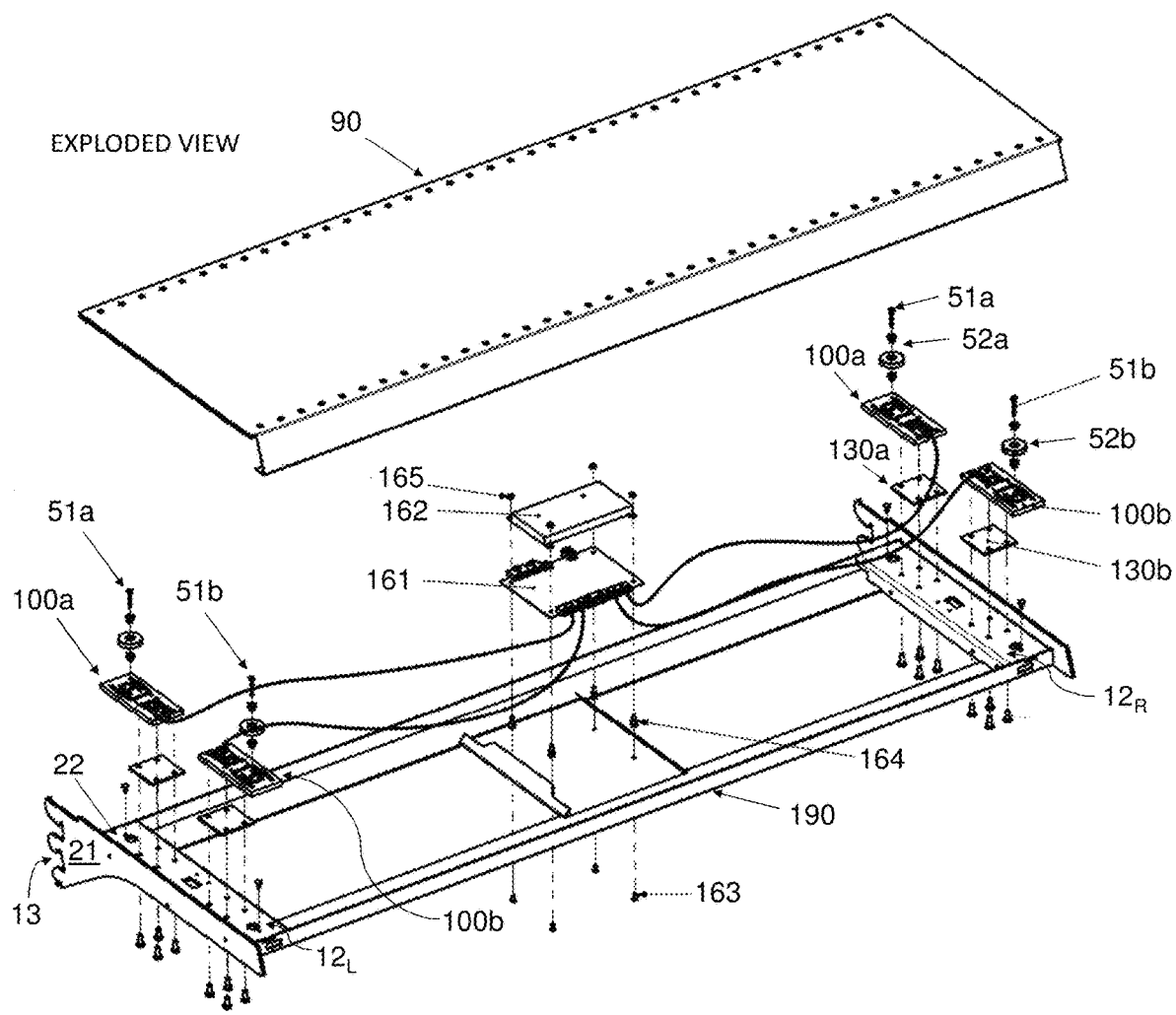

In the exemplary embodiment provided in FIGS. 4A and 4B, first and second flexure arrangements form a flexure arrangement 180, mechanically disposed between loading element 137 and measuring beams or spring elements 107*a* and 107*b*.

At least one strain gage, such as strain (or "strain-sensing") gages 120, may be fixedly attached to a surface (typically a top or bottom surface) of each of measuring beams 107*a* and 107*b*. Strain gages 120 may be adapted and positioned to measure the strains caused by a force applied to the top of the "free" or "adaptive" side 123 of load cell body 125. When a vertical load acts on free end (i.e., an end unsupported by the base, as shown in FIG. 4) 123 of load cell body 125, load cell body 125 undergoes a slight deflection or distortion, with the bending beams assuming a double-bending configuration having an at least partial, and typically primarily or substantially, double-bending behavior. The distortion is measurably sensed by strain gages 120.

It may thus be seen that planar load cell assembly 100 is a particular case of a load cell assembly, having the load beam and spring arrangement of FIG. 3A. In this case, the number of intermediate flexures is 2, such that m and n both equal zero. In addition, the intermediate flexures are intermediate flexure beam pairs connected by a flexure base. Similarly, the measuring beams are connected at a first end by the fixed end of load cell body 125, and at the opposite end by adaptive end 124 of load cell body 125.

A load cell body 125 may be made from a block of load cell quality metal or alloy. For example, load cell quality aluminum is one conventional and suitable material. In some embodiments, the alloy may advantageously be a magnesium alloy, typically containing at least 85%, at least 90%, and in some cases, at least 92%, at least 95%, or at least 98% magnesium, by weight or by volume. The magnesium alloy should preferably be selected to have an elastic module (E) that is lower, and preferably, significantly lower, than that of aluminum.

Any planar load cell assembly disclosed herein or otherwise suitable for use in this invention is one with a 'high' ratio of width to thickness, where 'width' is the dimension across a plan view of the planar load cell assembly, for example the dimension indicated by the arrow marked with w in FIG. 3A, and thickness is the dimension across a side view, for example the dimension indicated by the arrow marked with t in FIG. 3B. Although the figures attached herewith are not necessarily drawn to scale, the exemplary load cell assembly of FIGS. 4A and 4B can be seen to have a width-to-thickness ratio of more than 10. In some embodiments, the 'high' width-to-thickness ratio can be more than 2, more than 3, more than 5, or more than 10.

It should be noted that with respect to embodiments disclosed herein in which it is indicated that a load cell assembly is anchored so as to be attached at least indirectly to a load cell base (which in an assembled configuration is below the load cell assembly), such an arrangement represents a non-limiting example cited for convenience, and in any such embodiment a load cell assembly can alternatively be anchored so as to be attached to a shelf or shelf tray (which in an assembly configuration is above the load cell assembly). These two structural options can provide the same functionality of providing shelf assemblies and shelving units with built-in weighing capabilities.

Additional Weighing Assemblies Comprising Load Cell Assemblies

Additional non-limiting examples of weighing assemblies, comprising load cell assemblies and suitable for use in embodiments disclosed herein are now discussed Reference is now made to FIGS. 4A and 4B, which respectively, show an assembled weighing assembly 89 comprising two shelf brackets 12$_L$ and 12$_R$ according to embodiments of the present invention, and an exploded view of the weighing assembly. The weighing assembly 89 of FIGS. 4A and 4B is self-stabilizing, i.e., does not require the use of an additional stabilizing element or connection to a back wall of a shelving unit, and can be installed in a shelving unit (e.g., shelving unit 300) without any tools and by a single employee.

Substantially as shown, each of the two shelf brackets 12$_L$ and 12$_R$ may comprise a vertical member 21 which includes industry-standard bracket hooks 13 for engaging with uprights 85, and a horizontal member 22. Planar load cells 100 are fixed to the shelf bracket 12, in the same way as illustrated, e.g., in FIGS. 3A, 11A and 13, by anchoring them on a 'base' which, according to embodiments, can include the shelf bracket 12 and a shim (adapter plate) 130. As was discussed with reference to FIGS. 3B and 3C, mounting holes 142 are provided in load cell assembly 100, which line up with similarly-spaced shim holes 143. Thus, load cell assemblies 100A, 100B can be attached (by screw or rivet or any other appropriate attaching method) to a respective shim 130A, 130B and, in this way, complete the installation of the load cell assemblies on the 'base'.

The two shelf brackets 12$_L$ and 12$_R$ are joined mechanically by a shelf frame 190 which, although illustrated as a simple frame, can include any member(s) that, when joined with the shelf brackets 12$_L$ and 12$_R$, provide rigidity. The shelf frame 190 can be an 'open structural member' as shown in non-limiting example shown in FIG. 4B, as the 'openness' serves to reduce the weight and cost of the illustrated structural member, but this only is for purposes of illustration and the shelf frame need not be open if it is deemed desirable by a designer to use a solid, non-open member or assembly of members that provides structural rigidity at an acceptable weight and cost. Shelf frame 190 can be fabricated from any material such as a metal or a plastic deemed suitable in terms of rigidity, weight and cost.

As discussed earlier, protruding elements 51*a*, 51*b*, together with the joining elements 52*a*, 52*b*, can function to transfer the load (weight) of a shelf 90 and any products displayed thereupon to the load cell assemblies 100*a*, 100*b*. In embodiments, the protruding elements 51 can transfer the load directly by having a lower end positioned in a receptacle in the load cell assembly 100 and in other embodiments the protruding elements function to ensure the positioning of the joining elements 52 around the holes (140 in FIG. 4A) on the load cell assemblies 100 so as to transfer the load to the load cell assemblies 100 via the joining elements 52. In some embodiments, protruding elements 51 and joining elements 52 can be threaded (e.g., a threaded bolt and respective nut) and in other embodiments they can be unthreaded (e.g., a simple bolt and respective washer). In some embodiments both a threaded nut and a washer may be provided as shown in FIG. 4B. One of ordinary skill in the art will appreciate that various conventional arrangements can be employed for coupling the load (shelf 90) to the load cell assemblies 100*a*, 100*b*.

In the non-limiting example of FIG. 4B, a processor 161 is provided on-board the weighing assembly 89 in order to simplify communication with load cell assemblies. In the illustrated example, processor 161 is affixed to the shelf frame 190 with upper fasteners 165 and lower fasteners 163. A processor cover 162 can be provided, e.g., to protect the processor from dust, moisture or detritus, and spacers 164 may be used to isolate the processor from a metallic shelf frame 190.

Figure 5A:
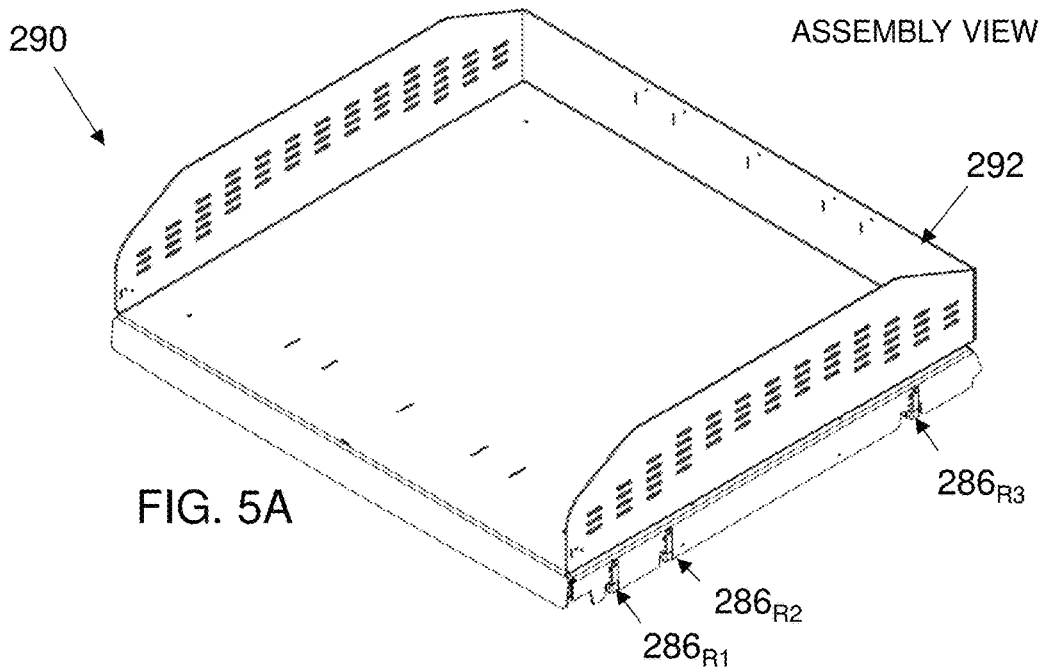
FIGS. 5A and 5B are respective assembled and exploded perspective views of a shelving unit, according to an embodiment of the present invention.
Figure 5B:
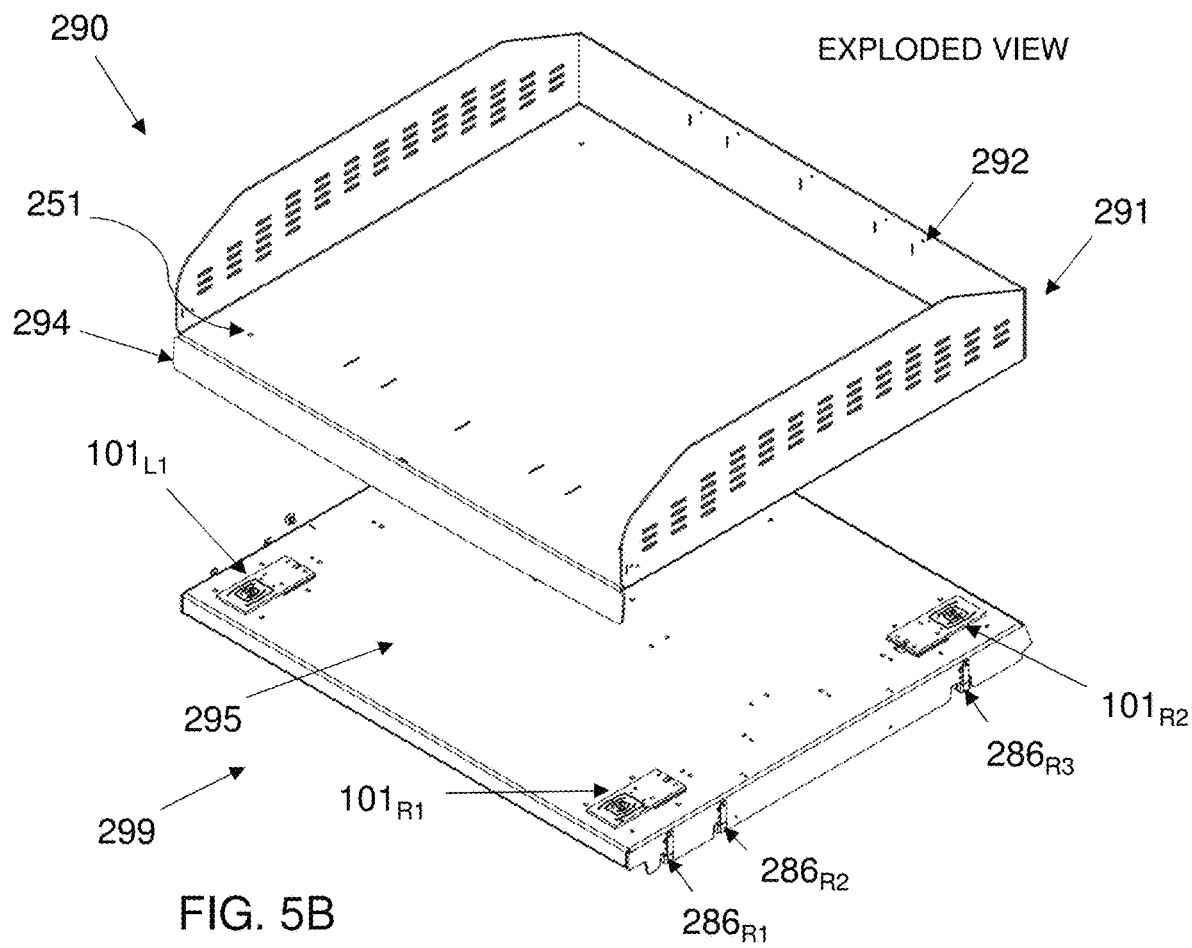

Referring now to FIGS. 5A and 5B, an example of a shelf assembly 290 according to an embodiment is shown in both assembled and exploded views. A shelf assembly 290 is a type of weighing assembly that comprises a weighing base 299 and a shelf or shelf tray 291. The weighing base 299 can comprise a shelf base 295 and a plurality of load cell installation assemblies 101. In this example four load cell installation assemblies $101_{L1}$, $101_{L2}$ (not shown, blocked by shelf tray 291), $101_{R1}$, $101_{R2}$ are provided, but a higher or lower number of load cell installation assemblies can be provided while meeting the design goal of providing accurate weight indications of products 70 on a shelf assembly 290 or added thereto or removed therefrom. The shelf tray 291 can include a receiving bracket (not shown) for securing and stabilizing a shelf tray 291 on a weighing base 299. In some embodiments a shelf tray 291 can be attached in other ways to a weighing bracket 299. A plurality of prior-art protruding elements 251 and a plurality of joining elements 252 vertically aligned with respective protruding elements 251 for receiving the respective protruding elements 251 can be provided for transferring load to the load cell assemblies 100. It should be noted that the number of respective protruding elements 251 and joining elements 252 will be the same as the number of load cell assemblies 100 for any given shelf assembly 290. For, example, in the non-limiting example shown in FIG. 4B, the number of load cell assemblies 100 (of load cell installation assemblies 101) is four, and thus four respective protruding elements 251 and four joining elements 252 are used.

It should be noted that use of the term 'shelf tray' should not be taken to literally mean a tray, e.g., as illustrated in the non-limiting example of FIGS. 5A and 5B wherein shelf tray 291 includes tray rim 292. Front flange 294 of shelf tray 291 is optional and has both aesthetic and functional purposes, e.g., obscuring the shelf base 295, the load cell installation assemblies 101 and the miscellaneous elements that might be provided for attachments. In other embodiments, shelf tray 291 can be flat without a tray rim 292, and if additional structural support is necessary for the shelf tray 291, e.g., to resist twisting or bending, it is possible to apply other engineering solutions for strengthening the structure.

Still referring to FIGS. 5A and 5B, a shelf assembly 290 can comprise attachment arrangements or points 286 which mate with attachment elements 285 of side walls 281 and/or back wall 280 of shelving unit 200. If attachment elements 285 comprise holes or recesses, then attachment points 286 can comprise protruding members such as hooks or knobs or similar, and vice versa—if attachment elements 285 comprise protruding members such as hooks or knobs, then attachment points 286 can comprise corresponding recesses or holes. Shelf assembly 290 preferably extends from left wall $281_L$ to right wall $281_R$ such that attachment points on the two sides can mate with attachment elements 285 or attachment components 289 that are joined to the attachment elements 285. In some embodiments, shelf assembly 290 has a width that is at least 80% or at least 90% or at least 95% of the distance between left wall $281_L$ and right wall $281_R$. According to embodiments, there is only a single shelf assembly 290 at any given height in shelving unit 220.

Figure 5C:
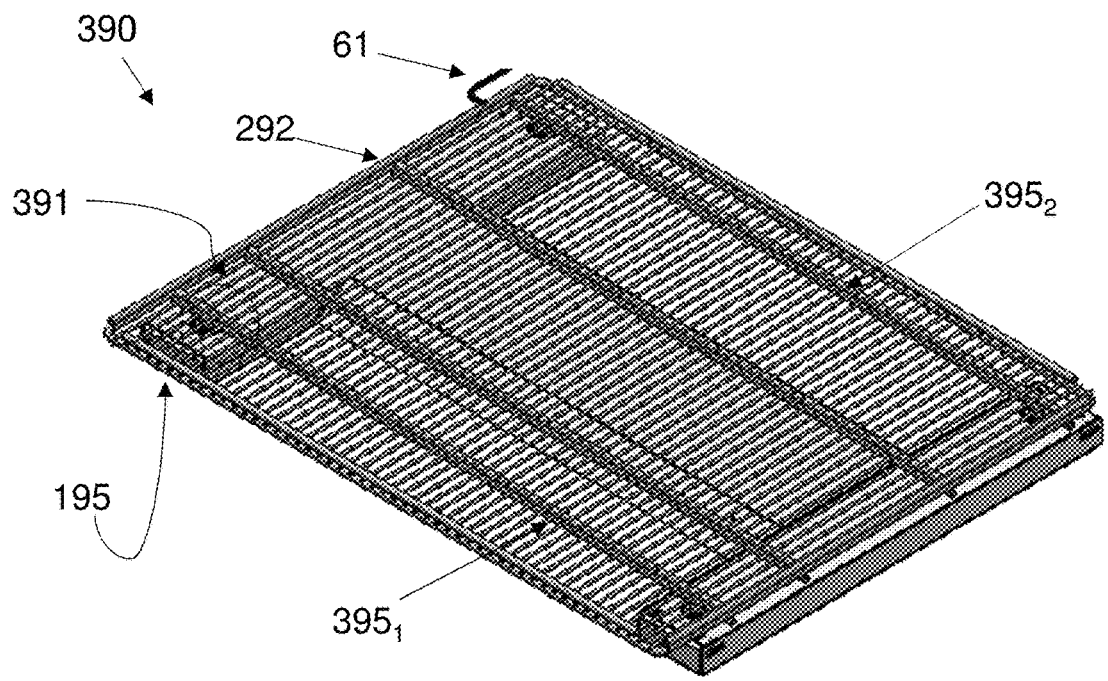
FIG. 5C shows a top-perspective schematic view of a shelf assembly according to embodiments of the present invention.
Figure 5D:
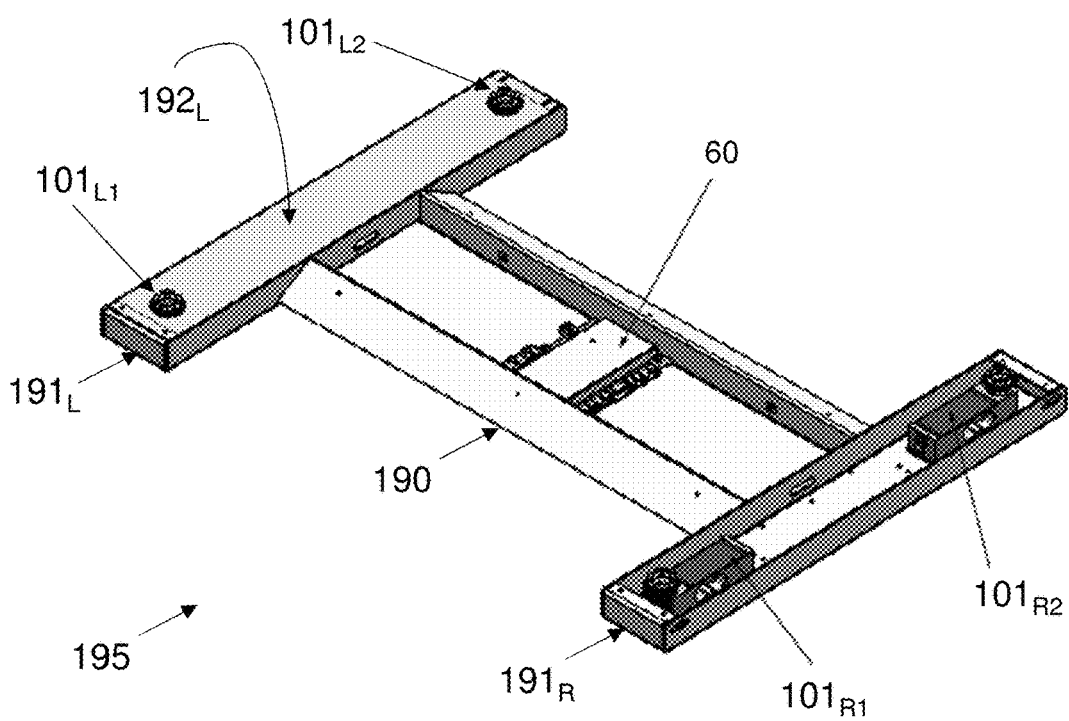
FIG. 5D shows a weighing base of the shelf assembly of FIG. 5C.
Figure 5E:
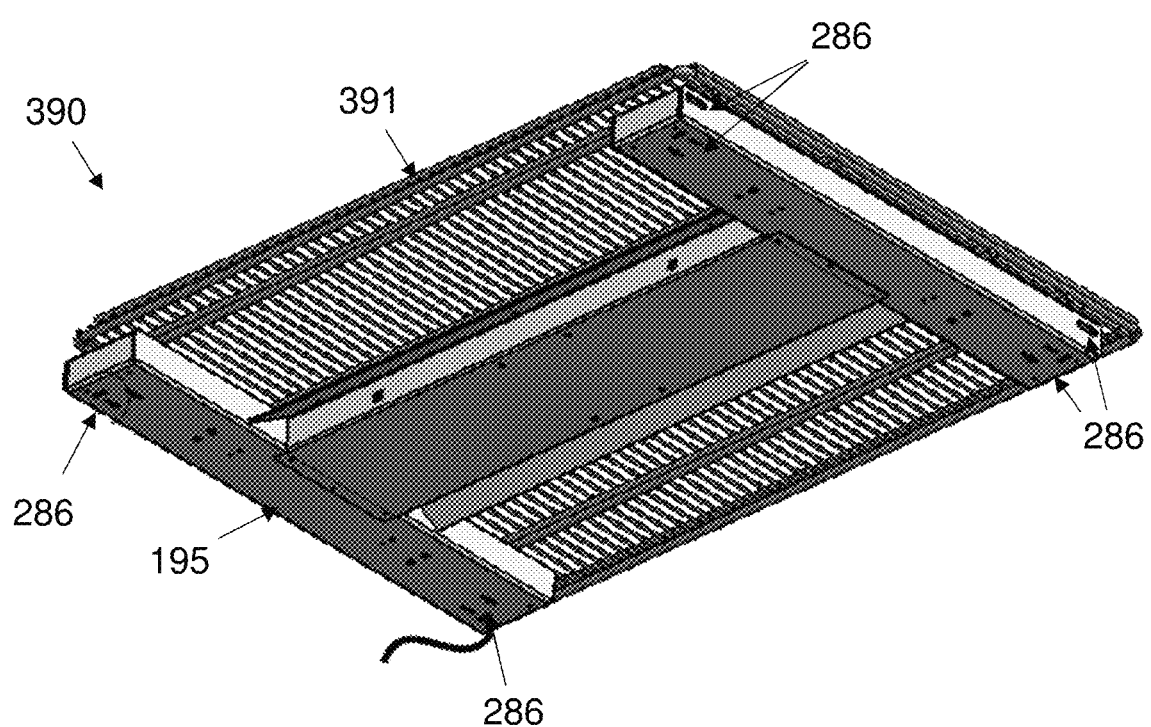
FIG. 5E shows a bottom-perspective schematic view of the shelf assembly of FIG. 5C.

We now refer to FIGS. 5C-E.

A shelf assembly 390 for a refrigerator includes a weighing base 195 and a shelf 391. The shelf 391 can include a peripheral rim 292 to reduce the likelihood that a product leans against the internal wall of the refrigerator 200, which would reduce the force measurable on the shelf 391. Weighing base 195 includes opposing load-cell bases $191_L$, $191_R$ detachedly attachable to respective left and right internal walls of the refrigerator. As shown in FIG. 5E, the bottom of the weighing base 195 (and therefore the bottom of the shelf assembly 390) includes attachment arrangements 286. Each of the load-cell bases 191 includes a plurality of load cells 101 (of any type, not necessarily planar load cells). Thus, there are at least two load cells 101 on each side, or at least 4 load cells for each weighing base 195. The two load-cell bases 191 are joined to form a rigid, e.g., stable, resistant to twisting, and/or not flexible, frame. A single-member beam 190 is shown as joining the two load-cell bases 191 but any appropriate design and number of left-to-right beams can be used. The beam can be used to support electronic communication arrangements 60, for example transmitted via a communications channel 61, as shown in FIG. 5D. In some embodiments, the load-cell bases 191 and/or the beam are covered with covers 192. It can be desirable for the weighing base 195 to allow at least a minimum amount of vertical airflow to flow freely within the interior of the refrigerator/shelving unit 200, and for this purpose a portion of the horizontal surface of the weighing base 195 can be 'open' to a vertical airflow, the term 'vertical' meaning any airflow within the refrigerator, which in many implementations is vertical or predominantly vertical, e.g., within ±10° of vertical, or within ±20° of vertical, or within ±30° of vertical, or within ±40° of vertical, or within ±45° of vertical. Preferably, at least 25% of the horizontal surface area of the weighing base 195 to vertical airflow, or at least 30%, or at least 35%, or at least 40%, or at least 45%, or at least 50%. In some embodiments, as much as 80% or as much as 70% or as much as 60% of the horizontal surface area of the weighing base 195 can be open to vertical airflow.

The horizontal area of the shelf 391 is also at least partly open to vertical airflow. In embodiments, the horizontal surface area of the shelf 391 can be at least 40% open or at least 50% open or at least 60% open or at least 70% open or at least 80% open or at least 90% open. In embodiments, the shelf 391 can utilize a wire grid design. A wire grid design is mostly open, and airflow passing through the open horizontal areas of the weighing base 195 is not be substantially blocked by the wires of the grid, which generally create minor turbulence as the air passes therethrough without a substantial pressure drop. In some embodiments, a wire-grid shelf can include both thinner wires, e.g., front-to-back wires deployed across the shelf 391 for supporting products, and thicker wires, e.g., left-to-right wires for structural support. As shown in FIG. 5C, left-to-right wires 395 are spaced so as to transmit force, e.g., the weight of the shelf and of products displayed thereupon, to the load cells assemblies 101 in the load-cell bases 191. Thus, the load cell assemblies 101 mediate between the weighing base 195 and the shelf 391, and the shelf 391 does not sit directly on the weighing base 195 or on the cover 192. The left-to-right wires 395 are illustrated in FIG. 5D as being thicker than the front-to-back wires, but in other examples they can all be the same thickness and weight. The skilled artisan will understand that a selection criterion for the left-to-right wires is sufficient rigidity, e.g., resistance to twisting, sagging, etc.

Figure 6:
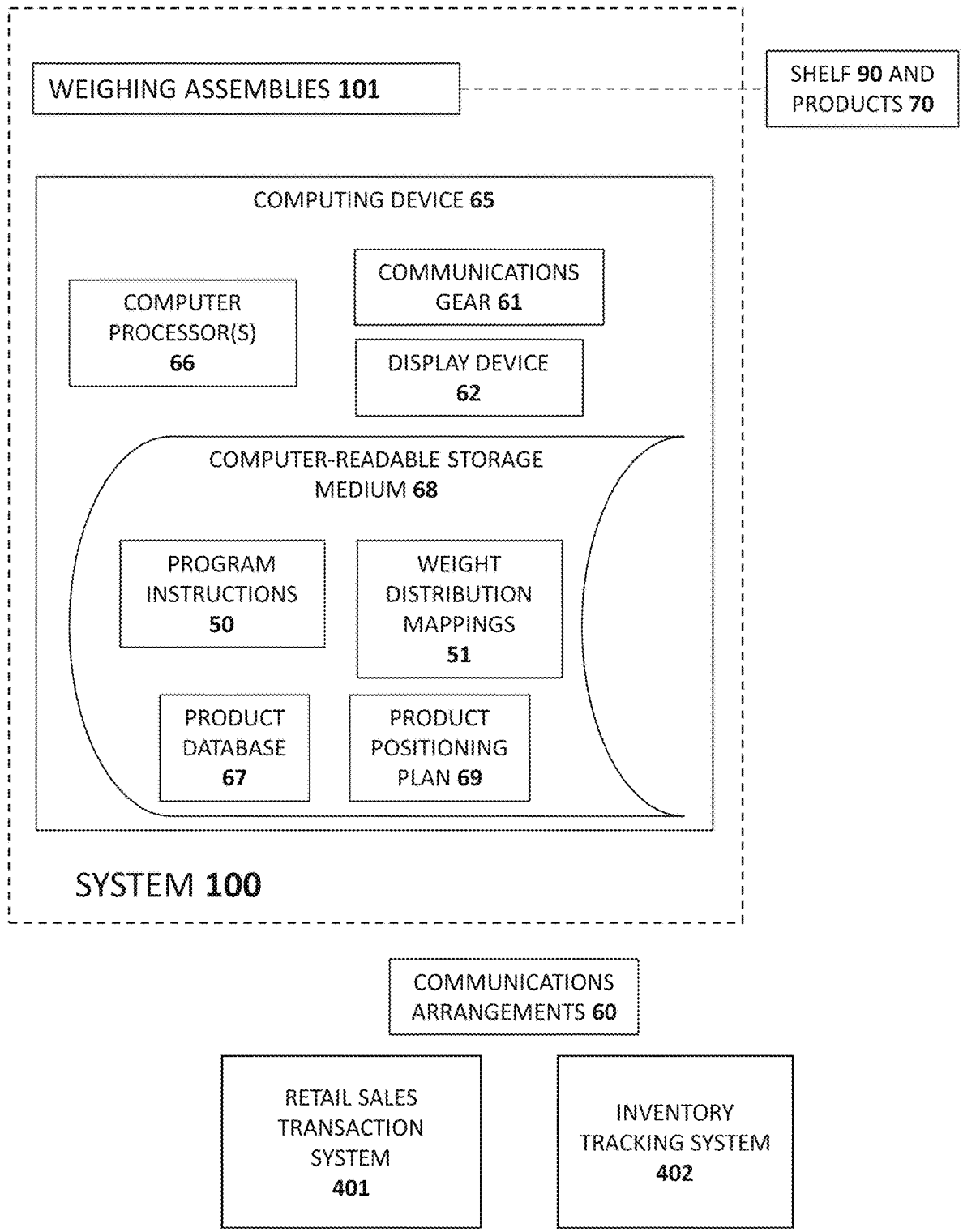
FIG. 6 shows a block diagram of a system for tracking non-homogeneous products on a shelf and tracking and mapping the weights of the products, according to embodiments.

Referring now to FIG. 6, a block diagram is shown of a system for tracking a non-homogeneous assortment of products 70 on a shelf 90. The system 100 can include a plurality of weighing assemblies 101 that are in contact with a shelf 90, which as explained above can support a variety of products 70. The system can also include one or more computer processors 66 and at least one non-transient computer-readable storage medium 68, e.g., a mechanical, optical and/or solid-state storage device or a storage device using whatever data storage technology is suitable for the purpose. The one or more computer processors 66 can optionally be included in a computing device 65 that can be a component of the system 100 and which can optionally include other computer hardware such as communications gear 61, a display device 62, and user input accessories (not shown), such as a keyboard and a mouse. The storage medium 68 can include program instructions 50, as well as weight distribution mappings repository 51, a product database 67 and product positioning plan 69, all of which are discussed elsewhere in this disclosure.

Transmissions of electronic signals from weighing assemblies 101 can be received by the one or more computer processors 66, for example by way of communications gear 61 and used for the purpose of tracking the weights of products 70 on the shelf 90, and especially of actions taken to products. Communications gear 61 can include any kind of wired or wireless communications arrangements, including, without limitation, direct connections, networked connections and internet connections. Actions include adding a product to a shelf, removing a product from a shelf, and moving a product from one place on a shelf to another. If the moving the product includes lifting the product and putting it back down on the same shelf, it may be interpreted as a removal followed by an adding depending on the speed of the actions and the sampling rate of the weight measurement data, e.g., the number of weight measurement data points per second. On the other hand, sliding a product from one place to another on the shelf might not change, at any given moment, the total weight measured by all of the weighing assemblies associated with a single shelf, but can change the weights measured by each of the individual weighing assemblies.

Electronic signals transmitted by the weighing assemblies, containing streams of weight measurement data points, can be monitored in order to track the weights of the products and the actions taken with respect thereto. Weight measurement data points from all of the weighing assemblies associated with a single shelf can be aggregated so as to track the total combined weight of the shelf and any products thereupon. This means synchronizing the streams of data points, i.e., aggregating the weight measurement data points means aggregating, for all weighing assemblies (for a single shelf) for each point in time. In some embodiments, there are four weighing assembly provided for each shelf, with each weighing assembly being proximate to one of the four respective corners of the shelf.

An individual weighing assembly 101 according to the various embodiments, returns and transmits a value that is less than the total combined weight of a shelf 90 and products arranged thereupon. The skilled artisan will appreciate that the combined weight is distributed amongst the various weighing assemblies 101 of the shelf 90, and the weight measurement data points across all weighing assemblies 101 for a single shelf 90 add up to the actual combined weight. The distribution of weight to the plurality of weighing assemblies 101 can be related to (i) the relative position of the center of weight of each product 70, (ii) any non-uniformities in the make-up or structure of the shelf 90, and (iii) any angle of displacement that may exist between the shelf 90 and a horizontal plane. For the purposes of the various embodiments and examples described in this disclosure, the relative position on the shelf is the factor generally discussed so as to simplify the discussion, but in each case, other factors such as non-uniformities and/or angle of displacement can also be considered as being important, even if not explicitly mentioned.

In embodiments, at least four load cell assemblies are employed per shelf, with appropriate spacing. The inventors have discovered that four load cell assemblies provide an optimal point that trades off accuracy of mapping with cost and complexity. Obviously, it is possible to deploy a load cell every few inches on an x-y grid, and thus achieve mapping at very high resolution, but at very high cost of both components and necessary processing power (including processing time which may exceed the time reasonably available for performing updated mapping for each product-weight event). The deployment of exactly four load cell assemblies has been found to yield mapping and determination of product-weight events with sufficient resolution and accuracy to satisfy the demands of real-time retail transactions, in a cost-effective manner that allows efficient processing of weight signals and other data sources in real-time. The four load cell assemblies can be suitably deployed at or close to the respective four corners of a shelf. In embodiments, 'close to' can mean within 2 cm, or within 5 cm, or within 10 cm, or within 15 cm, or within 20 cm of a corner. The placement of four load cells at the corners of a shelf is embodied in FIGS. 10 and 11, as will be discussed hereinbelow.

Discussion of a First Method

Figure 7:
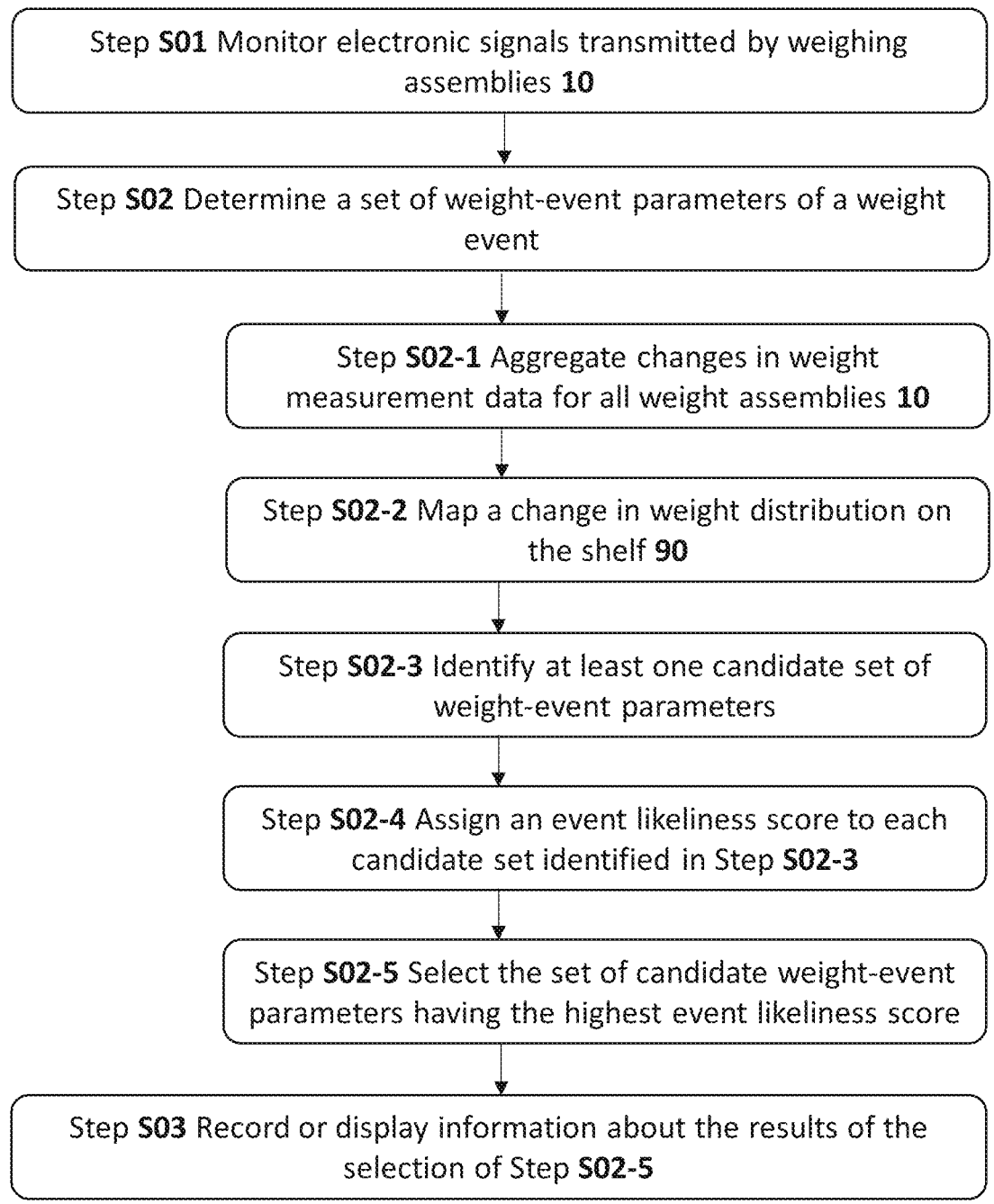
FIG. 7 shows a flowchart of a first method for tracking non-homogeneous products on a shelf, according to embodiments.

A first method for tracking non-homogeneous products on a shelf, according to embodiments of the present invention, is disclosed herein. According to the method, the tracking is done using weight data, and the method does not require, and does not incorporate, the use of any non-weight sensors such as optical scanners or cameras. A flow chart of the method is shown in FIG. 7. According to the method, a plurality of weighing assemblies 101 is jointly operable to measure the combined weights of the shelf 90 and any and all products 70 arranged thereupon.

The method, as shown in FIG. 7, comprises:

Step S01: monitoring electronic signals transmitted by weighing assemblies 10. Each electronic signal is from a different weighing assembly 101, and includes a respective stream of weight measurement data points. The weight measurement data points correspond to the weight of the shelf and the products arranged thereupon and, as mentioned earlier, each point reflects a portion of the total weight that is distributed among all of the weighing assemblies 101. The monitoring of the signals includes assessing the values, for example to detect changes in the weights over time, e.g., a difference between a first weight measurement data point at a first time and a second weight measurement data point at a second time, that can be indicative of an action taken with respect to a product.

Step S02: determining a set of weight-event parameters of a weight event. The determining is carried out in response to a change in values, over time, i.e., from one time point to another (not necessarily a consecutive time point) in weight measurement data. The determining can be carried out in response to such a change in values being greater than a given threshold, or that the absolute value of the change is greater than a given threshold. A weight event is an event in which an action is taken with respect to a product so as to change the weight or weight distribution of products on a shelf. Weight-event parameters include a product identification (or identification of more than one product involved in a single weight event, if appropriate) and an action taken with respect to the identified product (or products). A set of weight-event parameters can include a single product and a single action, or one or more products each associated with one or more actions. The determining can be probabilistic. Uncertainties in carrying out the method can mean that the determining selects the most likely set of weight-event parameters for a weight event. For example, the result of a determining can that that product #1 $70_1$ being added to a shelf 90 is the 'most likely' explanation for a detected change in weight measurement data, as opposed to product #2 $70_2$ being added or product #3 being added, both of which can be alternative but ultimately less likely candidates for the determining. The uncertainties can stem from any number of sources, including, for example, inaccuracy of the weighing assemblies or unresolved noise and/or drift in the stream of data points. An additional source of uncertainty can include the time it takes for a measurement made by weighing assembly to stabilize (e.g., as a function of the elasticity of a load cell component or of the shelf itself), combined with a system requirement to resolve the weight-event parameters within a limited amount of time, such that an actual total change in weight might not be captured because of a time constraint or other limitation. Other sources of uncertainty will be enumerated later in this discussion where relevant.

As shown in the flowchart of the method in FIG. 7, Step S02 includes five sub-steps, as follows:

Step S02-1: aggregating changes in weight measurement data for all weight assemblies 10. As used herein, 'aggregating' has the meaning of 'summing'. As discussed earlier, changes in weight measurement data are aggregated for each specific point in time; the aggregation can be for every point in time in a specific time interval or for all points in time as long as the monitoring of Step S01 continues, or for each determining; or for points in time selected according to a given periodicity or selected randomly; the only requirement is that aggregated data all correspond to a given point in time and therefore the streams are preferably synchronized.

Step S02-2: mapping a change in weight distribution on the shelf 90. A weight of a product placed on the shelf (for example) is distributed to all of the weighing assemblies of a shelf so that the aggregate of the increment in measurements made by all of the weighing assemblies equals the total incremental weight of the product; this step solves for the magnitude and location of the weight of the product placed on the shelf (i.e., or removed from the shelf or moved along the shelf) given the individual weight measurement data of the various weighing assemblies. In some embodiments the mapping can be deterministic, producing a single answer for the magnitude of the weight added/removed/moved and the coordinates of the center of weight of that weight. In other embodiments, the mapping can be probabilistic. For example, instead of mapping to a single weight center (X, Y), the mapping of product weight to x,y coordinates can be considered to have a probabilistic distribution (e.g., a density function). The probabilistic function can take into account, for example, unknowns with regards to the uniformity of the make-up or structure of the shelf, or with regards to possible angular displacement of the shelf from horizontal. It can also take into account inaccuracies in one or more of the weighing assemblies. Using a non-deterministic result out of the mapping sub-step can be another source in uncertainty in the overall determining step. In some embodiments the result of this mapping step can be stored in a repository of weight distribution mappings 51 in computer-readable storage medium 68.

Step S02-3: identifying at least one candidate set of weight-event parameters for the weight event. In this step, product data for reference can be accessed or retrieved from a product database 67 which can include, inter alia, baseline weights for products as well as ranges and distributions of possible and/or historical weights for products. Data for reference can be accessed or retrieved from a product positioning plan 69 (a planogram). The identifying includes matching a weight added/removed/moved ('the event weight') in Step S03-2 with the weight of a product according to data in the product database 67 and/or appearing in the planogram. The matching can return a single deterministic answer or can return an answer consisting of one or more products that may match the event weight, or come close with varying levels of probability. Probability may be assigned according to a wide variety of factors, some of which are illustrated in the following examples:

In an example, two products in the product database both have a weight matching the event weight, but only one of them is in the planogram for the shelf in question. While both products are identified in candidate sets of weight-event parameters, the one appearing in the planogram is assigned a higher probability.

In another example, two products in the product database both have a weight matching the event weight, but they appear in the planogram as belonging on other shelves. One belongs, according to the planogram, on a nearby shelf, while the other appears on a far-away shelf. While both products are identified in candidate sets of weight-event parameters, the one appearing in the planogram on a closer shelf is assigned a higher probability.

In another example, two products appearing in the product database and in the planogram have a weight matching the event weight, and the weight event is an addition to the shelf. The first product was identified with a 'removal' weight-event from the same shelf ten minutes earlier, and the second product was identified with a 'removal' event five minutes earlier. While both products are identified in candidate sets of weight-event parameters, the one identified in a removal weight event five minutes earlier is assigned a higher probability.

In another example, the aggregated change in weight on the shelf was 500 grams. A first product appearing in the planogram for that shelf weighs 50 grams more, according to the product database, and a second product weighs 30 grams less. While both products are identified in candidate sets of weight-event parameters, the product weighing 30 grams less is assigned a higher probability. In another example, the second product weighing 30 grams less 'belongs' on the left side of the shelf according to the planogram and the first product weighing 50 grams more belongs on the right side; according to the mapping of weight distribution in Step S2-02, the weight-center of the weight added or removed was closer to the right side, and the product weighing 50 grams more is assigned a higher probability.

In another example, two products appearing in the product database and in the planogram have a weight matching the event weight, and the weight event is a removal from the shelf. The first product has a sales rate of one can per week, and the second product has a sales rate of five cans per week. While both products are identified in candidate sets of weight-event parameters, the product with the higher sales rate is assigned a higher probability.

In yet another example, two products appearing in the product database and in the planogram have a weight matching the event weight, and the weight event is a removal from the shelf. The first product is 'on sale' this week at a 20% discount, and while both products are identified in candidate sets of weight-event parameters, the product with discount is assigned a higher probability.

In some embodiments, an assigned probability can be calculated using a probability distribution function. A probability distribution function can be pre-programmed based on hypothetical data and/or empirical data. A probability distribution function can be derived using a machine learning algorithm applied to historical weight data for a product.

In an illustrative example, two products appearing in the product database and in the planogram have a weight within three grams on either side of the event weight, and the weight event is a removal from the shelf. Associated with the first of the two product is a history of being 10 grams heavy 20 percent of the time and 5 grams heavy 30 percent of the time. The rest of the time, the product weight is within 2 grams either way of the baseline weight (e.g., the nominal, mean or median weight, or the 'listed' weight in the product database). Associated with the second of the two products is a history of being 10 grams heavy 5 percent of the time and within 3 grams either way of the baseline weight the remainder of the time. A probability distribution function derived using a machine learning algorithm applied to the respective historical weight data (a simplified version of which is presented in the foregoing example) for each of the two products assigns a higher probability to the second product. Nonetheless, both products are identified in candidate sets of weight-event parameters. The skilled artisan will appreciate that the machine learning algorithm selected for deriving probability distribution functions for product weights and calculating probabilities therefrom can be any of those known in the art and suited to the historical product-weight data, such as, for example and non-exhaustively: Linear Regression, Logistic Regression, Decision Tree, SVM, Naive Bayes, kNN, K-Means and Random Forest.

The skilled artisan will appreciate that any of the factors involved in the foregoing examples of assigning probabilities can be combined in any way, along with other intrinsic and extrinsic factors that can affect the assigning of probabilities.

Step S02-4: assigning an event likeliness score to each candidate set identified in Step S02-3. The foregoing discussion with respect to Step S02-3 included assigning probabilities to candidate sets of weight-event parameters, the assigning of an event likeliness score takes other factors into account as well, in addition to the probabilities assigned in Step S02-3. The 'other factors' can include the uncertainties discussed earlier including factors related to the weight measurement data, to noise and drift, to the uncertainty in mapping the weight distribution on the shelf, and so on. Thus, a final event likeliness score is assigned to each candidate set of weight-event parameters, so as to account for all of the uncertainty introduced in the various steps of the method.

Step S02-5: selecting the set of candidate weight-event parameters having the highest event likeliness score assigned in Step S02-4. The result of the 'selecting' in the last sub-step of Step S02 is therefore the result of the 'determining'.

Step S03: recording or displaying information about the results of the selection of Step S02-5. The results of the selecting (i.e., of the determining) can be recorded, for example in the non-transient computer-readable storage medium 68, or in a similar storage medium in another location, for example in the 'cloud', where the results are transmitted via an internet connection. The results, alternatively or additionally, can be displayed on a display device, such as display device 62 or on another display device, which, for purposes of illustration, can be one intended to convey information to a customer of an unattended retail arrangement, or the screen of an inventory clerk in a storage warehouse.

Any of the steps of the method can be carried out by the one or more computer processors 66. In some embodiments, not all of the steps of the method are necessarily carried out. In some embodiments, a system, e.g., the system 100 shown in FIG. 6, can be for tracking non-homogeneous products on a shelf and can comprise a plurality of weighing assemblies 101, one or more computer processors 66, and a computer-readable storage medium 68 containing program instructions 50 which, when executed by the one or more processors 66, can cause the one or more processors 66 to carry out the steps of the foregoing method.

Discussion of a Second Method

Figure 8:
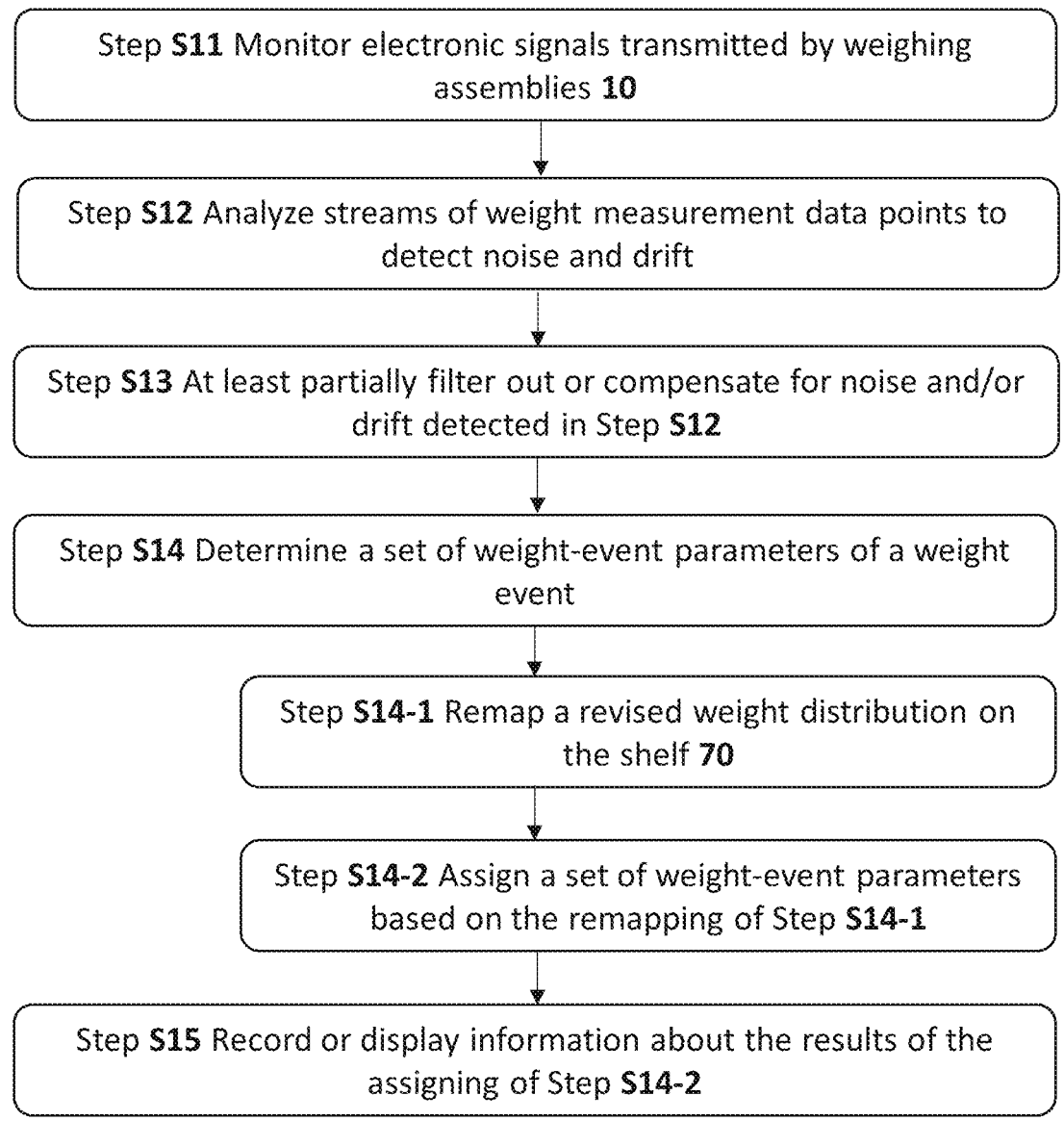
FIG. 8 shows a flowchart of a second method for tracking non-homogeneous products on a shelf, according to embodiments.

A second method for tracking non-homogeneous products on a shelf, according to embodiments of the present invention, is disclosed herein. According to the method, the tracking is done using weight data, and the method does not require, and does not incorporate, the use of any non-weight sensors such as optical scanners or cameras. A flow chart of the method is shown in FIG. 8. According to the method, a plurality of weighing assemblies 101 is jointly operable to measure the combined weights of the shelf 90 and any and all products 70 arranged thereupon.

The method, as shown in FIG. 8, comprises:

Step S11: monitoring electronic signals transmitted by weighing assemblies 10; this is the same method step as Step S01 in the 'first method' discussed above.

Step S12: analyzing streams of weight measurement data points to detect noise and drift. The analyzing is carried in response to finding, during the monitoring of Step S11, changes in values of the weight measurement data points. Specifically, the data points and the changes in value are analyzed for the presence either or both of the two anomalous phenomena of noise and drift. Noise for the purposes of this disclosure comprises high-frequency, i.e., short-lived, changes in values of weight measurement data points in a stream of such data points transmitted by the weighing assemblies. For example, noise can include spikes in value, which can be either 'plus' or 'minus' with respect to the baseline values, and which are substantially reversed (meaning at least 80% reversed, at least 90% reversed, at least 95% reversed, or at least 9% reversed) within less than 10 seconds after the spike begins, or within less than 5 seconds or within 1 second after the spike begins. In some embodiments, the source of noise can be mechanical and/or environmental. For example, noise can be caused by the vibration of an air conditioning condenser. Noise can be caused by simple mechanical events, such as a customer or employee touching a shelf or a product on the shelf. Drift for the purposes of this disclosure is a low-frequency, i.e., long-lived, change in weight measurement values, usually changes that are relatively minor in magnitude. Examples of causes of drift are daily cycles of indoor temperatures, environmental conditions such as humidity and atmospheric pressure, and artifacts of a power supply. Unlike what is termed herein noise, drift is not quickly reversed, because it is generally caused by a persistent and/or repeating condition. In some embodiments, drift is periodic; for example, the same pattern or trend can repeat itself every day at a certain time, or at the start of every work shift, or even in on an annual cycle in line with seasonal changes in the environment.

Step S13 at least partially filtering out or compensating for the noise and/or drift detected in Step S12. Noise and/or drift can mask true changes in weight embodied in the values of the weight measurement data points. Noise and/or drift can also affect the resolution and disambiguation of products and actions (weight-event parameters) by adding uncertainty and skewing probabilities. Therefore, it can be advantageous to filter out, or compensate for, noise and/or drift, at least partially. As is known in the art, a signal can commonly be decomposed into its component frequencies using a Fourier transform. Carrying out this step results in revised weight measurement data that can be generated as a result of the filtering out and/or compensating for noise and drift.

Step S14 determining a set of weight-event parameters of a weight event. As with the Step S02 determining step, the determining is carried out in response to a change in values, over time, i.e., from one time point to another (not necessarily a consecutive time point) in weight measurement data. The determining can be carried out in response to such a change in values being greater than a given threshold, or that the absolute value of the change is greater than a given threshold. A weight event is an event in which an action is taken with respect to a product. The weight-event parameters include a product identification (or identification of more than product involved in a single weight event, if appropriate) and an action taken with respect to the identified product (or products). A set of weight-event parameters can include a single product and a single action, or one or more products each associated with one or more actions.

As shown in the flowchart of the method in FIG. 8, Step S14 includes two sub-steps, as follows:

Step S14-1 remapping a revised weight distribution on the shelf 70. The remapping is somewhat similar to the mapping of S02-2 in that it involves solving for the magnitude and location of the weight of the product placed on the shelf or removed from the shelf or moved along the shelf, given the individual weight measurement data of the various weighing assemblies. However, in this case, the remapping is based on the change in values in the revised weight measurement data that was generated in Step S13, and not in the original weight measurement data transmitted by the weighing assemblies 101. The remapping is also based on an earlier mapping of weight distribution on the shelf, which can be accessed and retrieved from a repository of weight distribution mappings 51 in computer-readable storage medium 68. The earlier mapping can be the most recent mapping made in the case of a weight event, or it can be a mapping from a previous weight event. For example, to avoid processor overhead, a mapping can be stored only every third mapping or every fifth mapping, and so on. The remapping is also based on product-weight data accessed or retrieved from the product database 67.

Step S14-2 assigning a set of weight-event parameters based on the remapping of Step S14-1. This step is carried out using the results of the remapping of Step S14-1 to determine the weight-event parameters of a weight-event.

Step S15 recording or display information about the results of the assigning of Step S14-2. Other than the use of the term 'assigning' instead of 'selecting', this step is identical to Step S03 of the first method.

Any of the steps of the method can be carried out by the one or more computer processors 66. In some embodiments, not all of the steps of the method are necessarily carried out.

In some embodiments, a system, e.g., the system 100 shown in FIG. 6, can be for tracking non-homogeneous products on a shelf and can comprise a plurality of weighing assemblies 101, one or more computer processors 66, and a computer-readable storage medium 68 containing program instructions 50 which, when executed by the one or more processors 66, can cause the one or more processors 66 to carry out the steps of the foregoing method.

In some embodiments, the entire determining step S14 can be replaced with determining step S02 so as to combine, inter alia, the noise and drift filtering and compensation features of the second method with, inter alia, the probability-calculation and machine learning features of the first method. In some embodiments, the program instructions 50 of system 100 can be modified so as to combine the steps of the two foregoing methods in the same way.

Discussion of a Third Method

A method of mapping the weight distribution of a non-homogeneous plurality of products on a shelf, according to embodiments of the present invention, is disclosed herein. According to the method, the mapping is done using weight data, and the method does not require, and does not incorporate, the use of any non-weight sensors such as optical scanners or cameras. A flow chart of the method is shown in FIG. 9.

Figure 9:
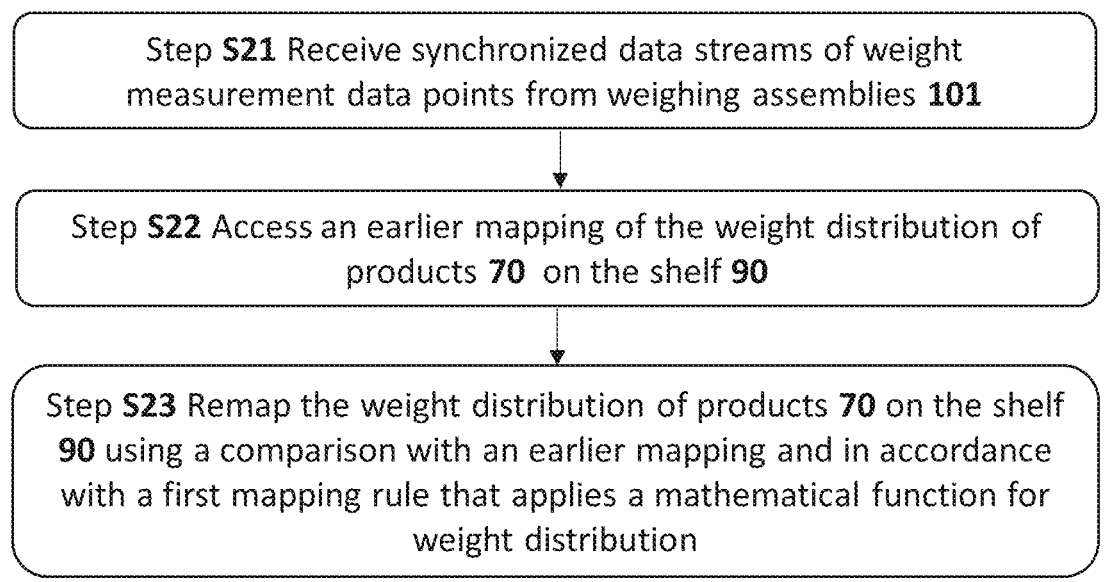
FIG. 9 shows a flowchart of method for mapping the weight distribution of a non-homogeneous plurality of products on a shelf, according to embodiments.

The method, as shown in FIG. 9, comprises:

Step S21 receiving synchronized data streams of weight measurement data points from weighing assemblies 101. Each of the weight measurement data points represents a proper fraction (i.e., between 0 and 1) of the total combined weight of the shelf and of any products arranged thereupon, and the sum of the proper fractions represented by the weight measurement data points from all of the weighing assemblies 101 for any given time is equal to one.

Step S22 accessing an earlier mapping of the weight distribution of products 70 on the shelf 90, which can be accessed and retrieved from a repository of weight distribution mappings 51 in computer-readable storage medium 68. The earlier mapping can be the most recent mapping made in the case of a weight event, or it can be a mapping from a previous weight event. For example, to avoid processor overhead, a mapping can be stored only every third mapping or every fifth mapping, and so on. The remapping is also based on product-weight data accessed or retrieved from the product database 67.

Step S23 remapping the weight distribution of products 70 on the shelf 90 using a comparison with an earlier mapping accessed in Step S22, and in accordance with a first mapping rule that applies a mathematical function for weight distribution.

Figure 10:
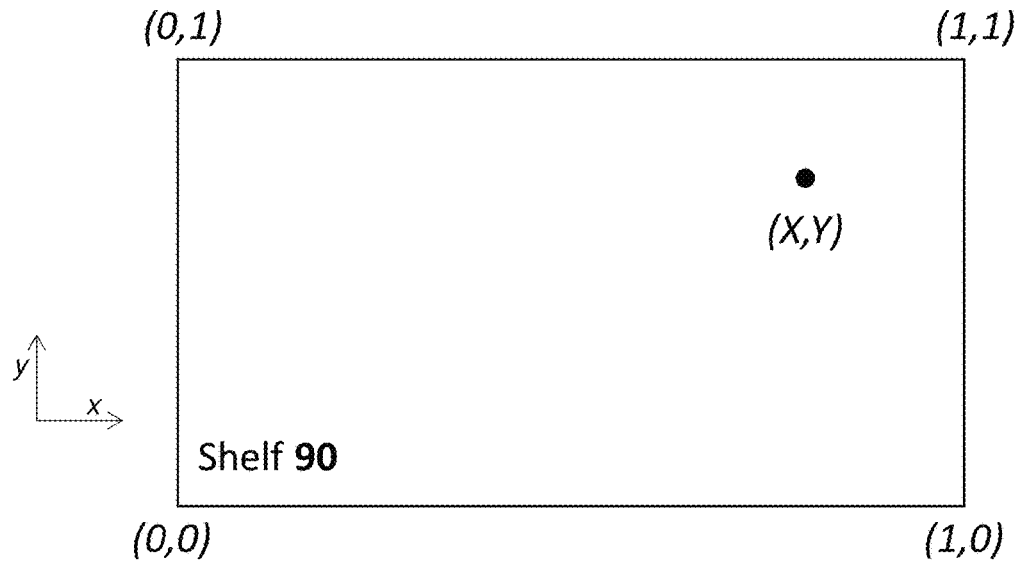
FIGS. 10 and 11 are respective schematic illustrations of two different embodiments of a first mapping rule that applies a mathematical function for weight distribution.

An example of a first mapping rule is a mapping rule that distribution of weight to weighing assemblies includes application of a linear function. An example of such a linear function is illustrated in FIG. 10, where the linear function is such that on a shelf 90 defining an x-y plane and having an origin at (0,0) and the diagonally opposite corner at (1,1), addition of a product on the shelf with weight of W and weight-center coordinates of (X,Y) causes weighing assemblies at (0,0), (0,1), (1,1), (1,0) to transmit respective weight measurement data points incremented by $(1-X)*(1-Y)*W$, $(1-X)*Y*W$, $X*Y*W$, $X*(1-Y)*W$. Obviously, removal of the same product from the same coordinate would cause the same weighing assemblies to transmit respective weight measurement data points decremented by the same respective values.

Figure 11:
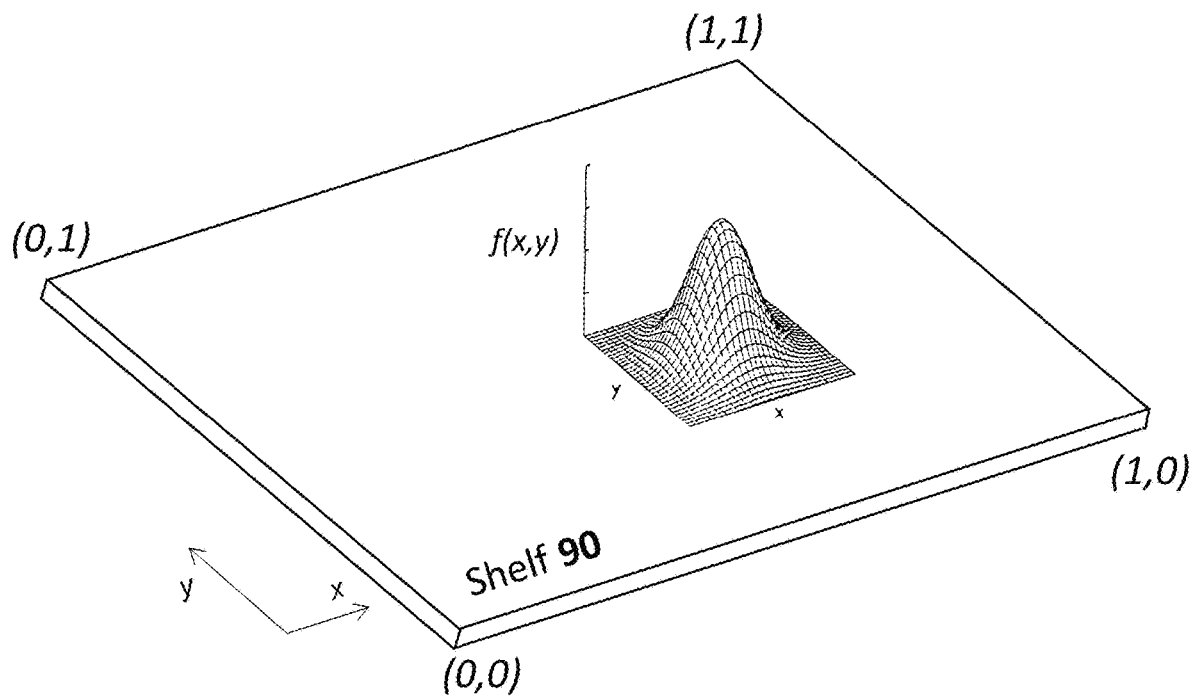

Another example of a first mapping rule that the weight distribution of a product on a shelf is mapped from the weight measurement data points using a probability density function. An example of such a function is illustrated in FIG. 11, where the distribution function is such that on a shelf defining an x-y plane each product is represented in the remapped weight distribution at multiple (x,y) points. The probability density function can be, as in the example shown in FIG. 11, is a bivariate normal distribution such that the multiple (x,y) points are distributed according to a first normal distribution on the x-axis and according to a second normal distribution on the y-axis.

The remapping of Step S23 can also be in accordance with a second mapping rule. An example of a second mapping rule is that the remapping uses weight measurement data points corresponding to a time interval that is constrained. For example, the time interval can be constrained with respect to the 'stabilization time' of a shelf 90 and weighing assemblies 101 following a weight event. Stabilization time can be a function of a mechanical parameter, such as elasticity, of the shelf 90 and/or the weighing assemblies 101 or of a component thereof. The time interval can be constrained, for example, to end when differences between successive periodically accessed values (i.e., consecutive values or every nth value for any integer n) of weight measurement data points in a data stream fall below a predetermined threshold, meaning that the measurements are stabilizing. In some embodiments, the time interval is constrained to a pre-determined length of time. The pre-determined length of time can be calculated in advance from empirical or theoretical valuation of stabilization time based on a mechanical parameter of the shelf 90 or of the weighing assemblies 101 (or of a component thereof). Alternatively, the pre-determined length of the time interval can be based on a typical time between weight events caused by a shelf stocker or other employee, or by a customer.

In some embodiments, the remapping of Step S23 is additionally carried out on the basis of information accessed from a product positioning plan 69.

Any of the steps of the method can be carried out by the one or more computer processors 66. In some embodiments, not all of the steps of the method are necessarily carried out. In some embodiments, a system, e.g., the system 100 shown in FIG. 6, can be for mapping the weight distribution of a non-homogeneous plurality of products on a shelf and can comprise a plurality of weighing assemblies 101, one or more computer processors 66, and a computer-readable storage medium 68 containing program instructions 50 which, when executed by the one or more processors 66, can cause the one or more processors 66 to carry out the steps of the foregoing method.

In some embodiments, the method can be combined with either of the first two method, for example by replacing Step S02-2 of the first method with Steps S22 and S23 so as to combine, inter alia, the rule-based mapping features of the third method with the features of the first method. As another example, Step S14-1 of the second method can be replaced with Steps S22 and S23 so as to combine, inter alia, the rule-based mapping features of the third method with the features of the second method.

In some embodiments, the program instructions 50 of system 100 can be modified so as to combine the steps of the methods in the same way.

Referring again to FIG. 6, the results of carrying out any of the methods or program instruction steps disclosed herein by a system 100 can be communicated, using communications arrangements 60, to either or both of a retail sales transaction system 401 and an inventory tracking system 402 for further processing. Communications arrangements 60 can include wired or wireless communications, through any kind of dedicated connection or network connection or internet-based connection, as are known in the art.

Unless otherwise defined herein, words and phrases used herein are to be understood in accordance with their usual meaning in normal usage. Some terms used herein are terms of art in the industries that supply and use shelving assemblies, for example (and not exhaustively): An "upright" is a post or rod fixed vertically as a structural support for other components in a shelving unit and to bear the load of the shelves and any goods displayed thereupon, generally including holes or other arrangements along at least two faces for the attachment of shelf brackets. An upright, unless it is at the end of continuous run of shelving, is shared by two adjacent shelving units and therefore a standard "shelving unit" is considered to include only one upright. In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a shelf" or "at least one shelf" may include a plurality of markings.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A method for mapping a change in weight distribution of a non-homogeneous plurality of products on a shelf, the method comprising:
   a. receiving, from each of a plurality of weighing assemblies in contact with the shelf and jointly operable to measure the combined weight of the shelf and of products arranged thereupon, respective synchronized data streams of weight measurement data points, each of the weight measurement data points representing a proper fraction of the total weight of the shelf and of any products arranged thereupon, wherein the sum of the proper fractions represented by the received weight measurement data points for any given time is equal to one, the receiving including receiving, in response to an action taken with respect to a product, a weight measurement data point with a changed value, wherein said action taken with the respect to the product is one of: (i) removing the product from the shelf, (ii) adding the product to the shelf, and (iii) moving the product from one position on the shelf to another;
   b. accessing an earlier mapping of the weight distribution of products on the shelf; and
   c. in response to receiving said weight measurement data point with said changed value, remapping the weight distribution of products on the shelf, wherein the remapping includes (i) mapping a current weight distribution of the products on the shelf from said received synchronized data streams of weight measurement data points in accordance with a first mapping rule that applies a mathematical function for weight distribution, and (ii) comparing said current mapped weight distribution with said earlier mapping.

2. The method of claim 1, wherein the first mapping rule is that distribution of weight to weighing assemblies includes application of a linear function, such that on a shelf defining an x-y plane and having an origin at (0,0) and a diagonally opposite corner at (1,1), addition of a product on the shelf with weight of W and weight-center coordinates of (X,Y) causes weighing assemblies at (0,0), (0,1), (1,1), (1,0) to transmit respective weight measurement data points incremented by $(1-X)*(1-Y)*W$, $(1-X)*Y*W$, $X*Y*W$, $X*(1-Y)*W$.

3. The method of claim 1, wherein the first mapping rule is that the weight distribution of a product on a shelf is mapped from the weight measurement data points using a probability density function, such that on a shelf defining an x-y plane each product is represented in the remapped weight distribution at multiple (x,y) points.

4. The method of claim 3, wherein the probability density function is a bivariate normal distribution such that the multiple (x,y) points are distributed according to a first normal distribution on the x-axis and according to a second normal distribution on the y-axis.

5. The method of claim 1, wherein the remapping is additionally carried out in accordance with a second mapping rule, wherein the second mapping rule is that the remapping uses weight measurement data points corresponding to a time interval that is constrained.

6. The method of claim 5, wherein the time interval is constrained to end when differences between successive periodically accessed values of weight measurement data points in a data stream fall below a predetermined threshold.

7. The method of claim 5, wherein the length of the time interval is pre-determined and is based on a mechanical parameter of at least one of the shelf and a weighing assembly.

* * * * *